(12) United States Patent
Ring et al.

(10) Patent No.: US 10,848,561 B2
(45) Date of Patent: Nov. 24, 2020

(54) DYNAMIC CONTENT AND CLOUD BASED CONTENT WITHIN COLLABORATIVE ELECTRONIC CONTENT CREATION AND MANAGEMENT TOOLS

(71) Applicant: Deltek, Inc., Herndon, VA (US)

(72) Inventors: Devon Ring, Ottawa (CA); Chris D'Aoust, Carp (CA); Matthew Richer, Kanata (CA)

(73) Assignee: Deltek, Inc., Herndon, VA (US)

( * ) Notice: Subject to any disclaimer, the term of this patent is extended or adjusted under 35 U.S.C. 154(b) by 7 days.

(21) Appl. No.: 16/173,302

(22) Filed: Oct. 29, 2018

(65) Prior Publication Data

US 2019/0132393 A1 May 2, 2019

Related U.S. Application Data

(60) Provisional application No. 62/578,595, filed on Oct. 30, 2017.

(51) Int. Cl.
| | |
|---|---|
| *H04L 29/06* | (2006.01) |
| *G06F 8/10* | (2018.01) |
| *G06F 15/16* | (2006.01) |
| *G06F 21/00* | (2013.01) |
| *G06F 15/177* | (2006.01) |
| *H04L 29/08* | (2006.01) |
| *G06F 9/54* | (2006.01) |
| *G06F 16/958* | (2019.01) |
| *G06F 16/955* | (2019.01) |

(52) U.S. Cl.
CPC ......... *H04L 67/1097* (2013.01); *G06F 9/547* (2013.01); *G06F 16/958* (2019.01); *G06F 16/9566* (2019.01); *G06F 16/986* (2019.01); *H04L 67/02* (2013.01); *H04L 67/34* (2013.01)

(58) Field of Classification Search
CPC ......... G06F 9/44; G06F 21/629; H04L 63/14; H04L 41/145; H04L 9/088
USPC ............... 709/205, 218, 219, 246; 719/318; 717/124, 125, 127, 135
See application file for complete search history.

(56) References Cited

U.S. PATENT DOCUMENTS

| | | | |
|---|---|---|---|
| 9,519,886 B2 | 12/2016 | Berger et al. | |
| 10,567,537 B2* | 2/2020 | Sampath | ................. H04L 67/02 |
| 2008/0082381 A1 | 4/2008 | Muller et al. | |
| 2008/0191825 A1 | 8/2008 | Wright et al. | |

(Continued)

OTHER PUBLICATIONS

"A Framework for Automated Testing of JavaScript Web Applications"—Artzi et al, IBM Research, Aarhus University, May 11, 2011 https://cs.au.dk/~amoeller/papers/artemis/paper.pdf (Year: 2011).*

(Continued)

*Primary Examiner* — Randy A Scott
(74) *Attorney, Agent, or Firm* — Snyder, Clark, Lesch & Chung, LLP

(57) ABSTRACT

Systems and methods are described for collaborative work hypertext markup language assets. The assets may be stored on a remote server. The methods may include instantiating a portable software test framework between an application local to a user and the remote server in dependence upon a uniform resource locator associated with the HTML asset and a request to acquire the HTML asset in response to a request for an HTML asset.

7 Claims, 22 Drawing Sheets

(56) References Cited

U.S. PATENT DOCUMENTS

| | | |
|---|---|---|
| 2011/0289419 A1* | 11/2011 | Yu ..................... G06F 9/44526 |
| | | 715/738 |
| 2012/0284176 A1 | 11/2012 | Svendsen et al. |
| 2013/0179761 A1 | 7/2013 | Cho et al. |
| 2013/0198266 A1* | 8/2013 | Kiley ..................... H04L 67/34 |
| | | 709/203 |
| 2013/0283147 A1 | 10/2013 | Wong et al. |
| 2016/0110313 A1 | 4/2016 | Prakash et al. |
| 2016/0366196 A1 | 12/2016 | Boss et al. |
| 2018/0046731 A1 | 2/2018 | Peretz et al. |
| 2018/0101516 A1 | 4/2018 | McCluskey |
| 2018/0373885 A1* | 12/2018 | Arad ..................... H04L 9/088 |

OTHER PUBLICATIONS

Shay Artzi et al. "A Framework for Automated Testing of JavaScript Web Applications" ICSE '11, Proceedings of the 33rd International Conference on Software Engineering, pp. 571-580, May 21, 2011 (May 21, 2011).

* cited by examiner

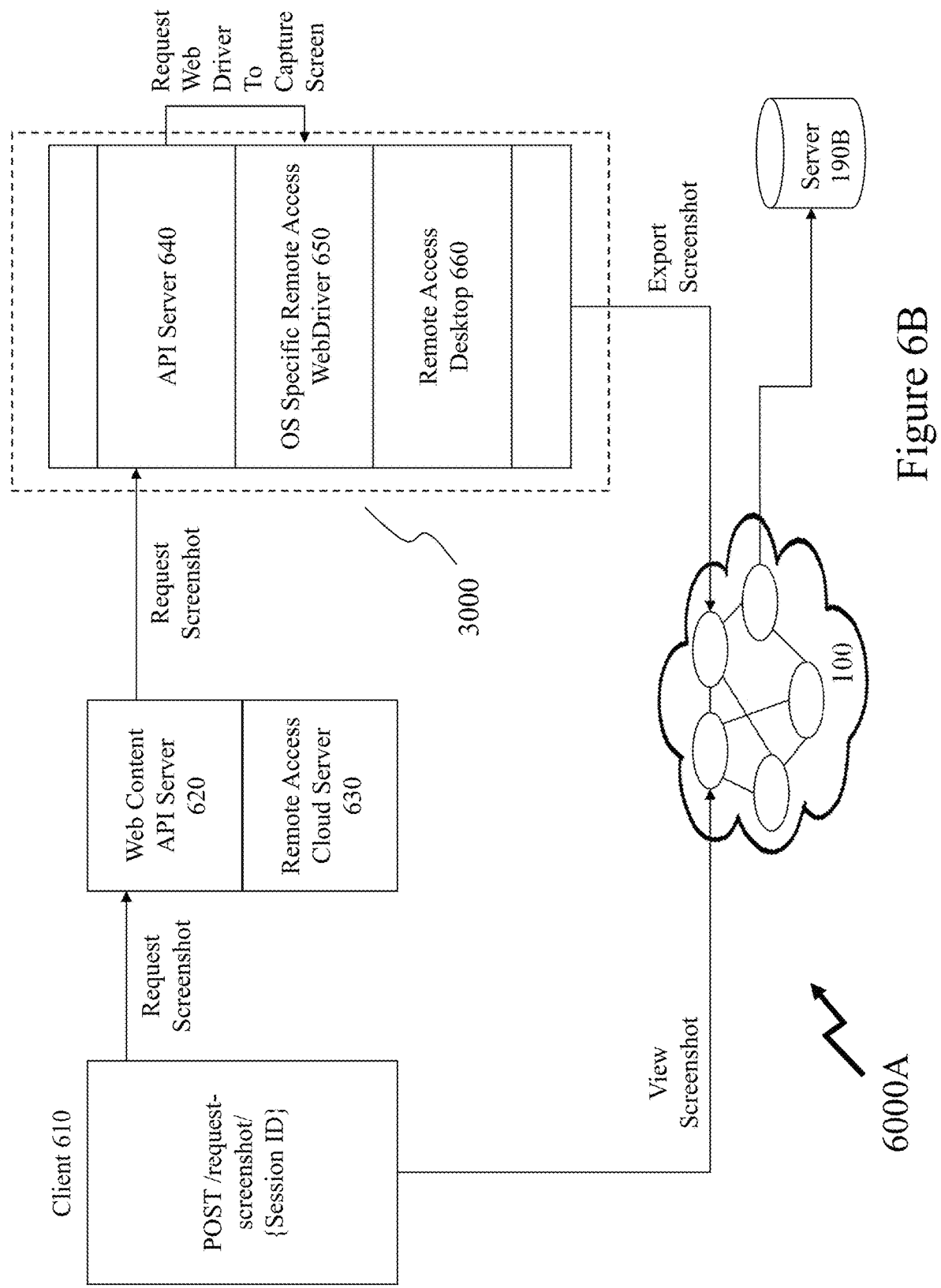

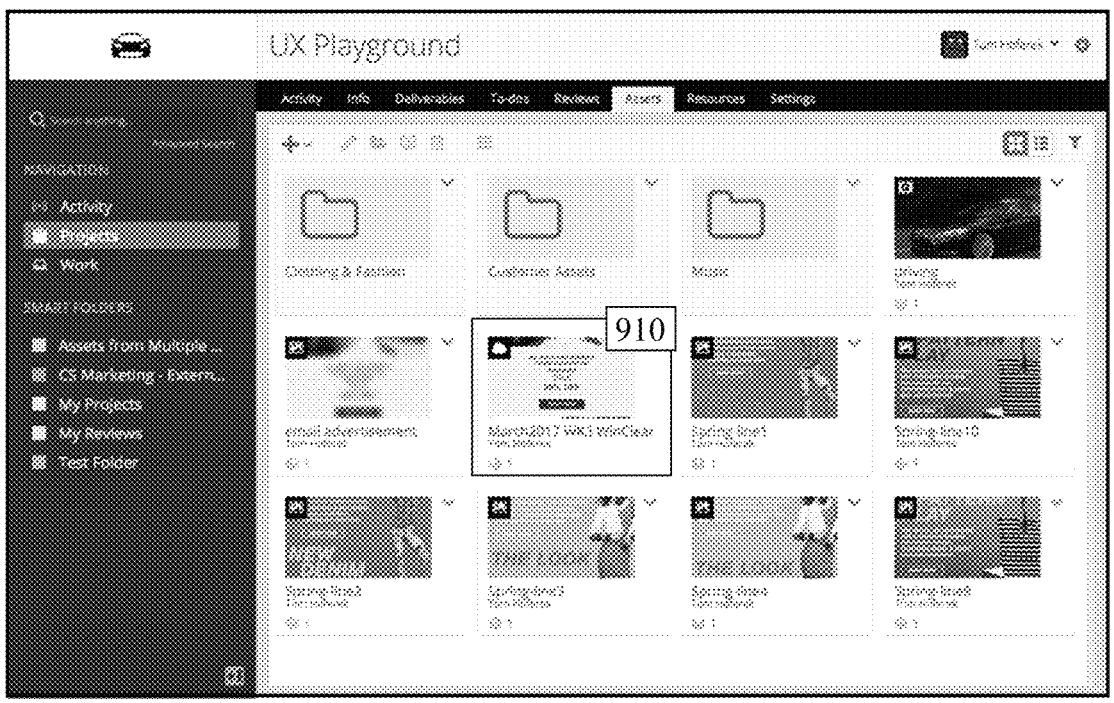
Figure 9　　　　　　　　900
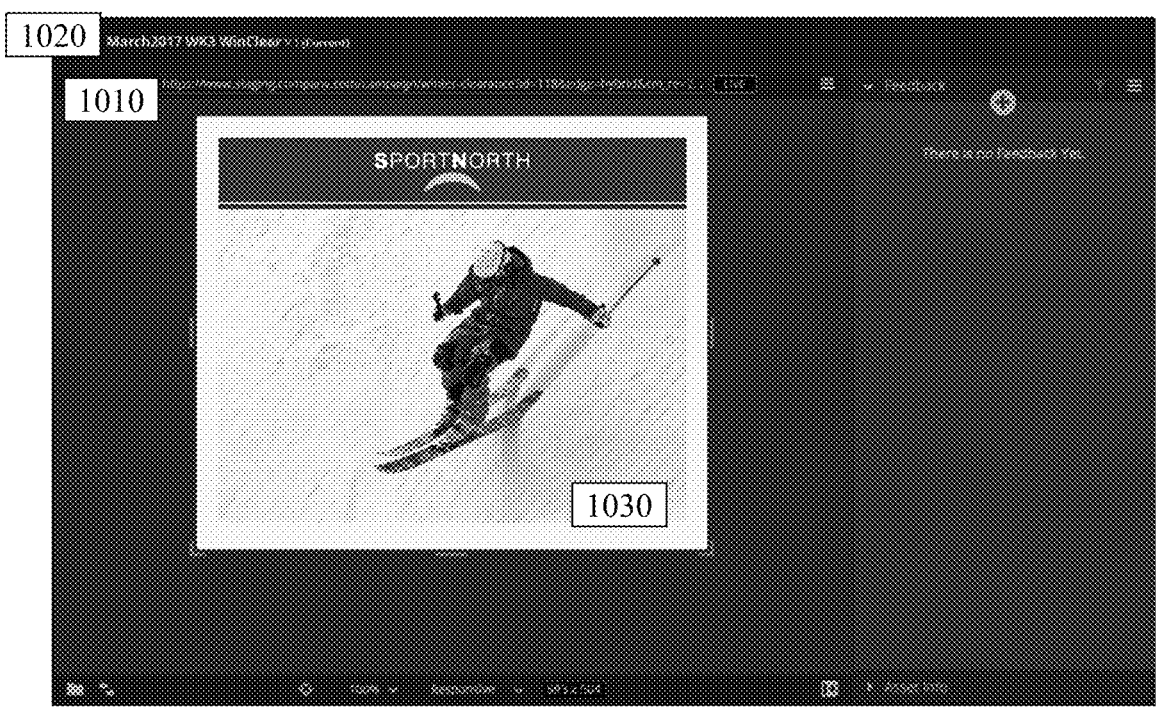
Figure 10　　　　　　　　1000

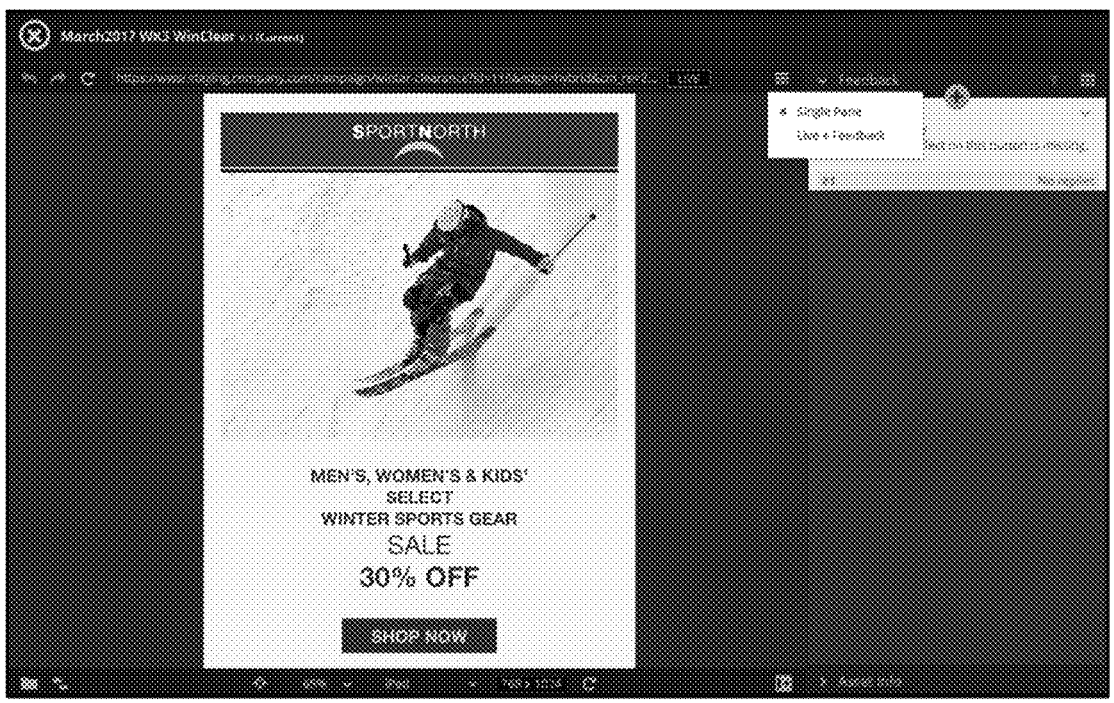
Figure 23                                    2300
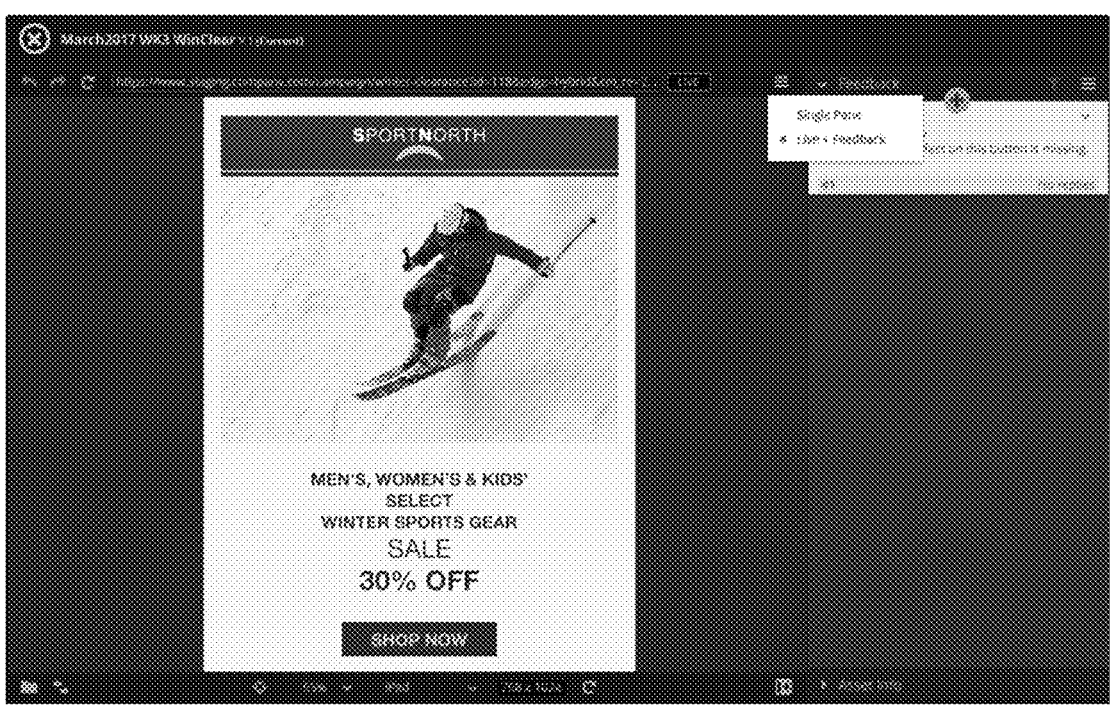
Figure 24                                    2400

DYNAMIC CONTENT AND CLOUD BASED CONTENT WITHIN COLLABORATIVE ELECTRONIC CONTENT CREATION AND MANAGEMENT TOOLS

CROSS REFERENCE TO RELATED APPLICATION

This application claims priority under 35 U.S.C. § 119, based on U.S. Provisional Patent Application No. 62/578,595 filed Oct. 30, 2017, the disclosure of which is hereby incorporated herein by reference in its entirety.

FIELD OF THE INVENTION

The present invention relates to content creation and creation management and more particularly to methods and systems for creation and management of dynamic electronic content and/or cloud based electronic within collaborative content creation tools and environments.

BACKGROUND OF THE INVENTION

Content creation is the contribution of information to media and most especially to digital media for an end-user/audience in specific contexts. Content is something expressed through a medium such as traditional print-based publishing, electronic publishing, social media, websites, etc. Typical forms of content creation include maintaining and updating web sites, blogging, photography, videography, online commentary, the maintenance of social media accounts, and editing and distribution of digital media.

Content creation has evolved dramatically in the last twenty to thirty years, initially with the general availability of computers, then cheap bitmapped displays and What You See Is What You Get (WYSIWYG) software, and finally with the World Wide Web (Internet). The Internet allows for rapid low cost distribution of created content to potential audiences of hundreds of millions depending upon the platform the content is published upon. These technological developments have also meant that content creation tools are available today by a wider socioeconomic user base without geographical boundaries than ever before.

Accordingly, while a significant proportion of created content remains within the traditional business sectors of news, advertising, publishing and Government an increasing proportion is coming from users within other business sectors as well as individuals. Content creators therefore today may include, but are not limited to:

News organizations whose content creation is primarily information to any media and most especially to digital media for an end-user/audience in specific contexts and while the rise of digital media has disrupted traditional news outlets many have adapted as others have equally arisen producing content designed to function on the web and be shared by social media users.

Academic institutions create content in the form of books, journal articles, white papers, and some forms of digital scholarship, such as blogs that are group edited by academics, class wilds, or video lectures that support a massive open online course (MOOC) etc.

Corporate content includes advertising and public relations content, as well as other types of content produced for profit, including white papers and sponsored research.

Governments create online or digital propaganda or misinformation to support law enforcement or national security goals.

Consumers since the introduction of Web 2.0 are more involved in the generation and sharing of content where digital media and the ease of access at home have resulted in increased user generated content as a widening age and class range.

Younger users having more access to content and content creating applications and publishing to different types of media, for example, Facebook™ DeviantArt™, or Tumblr™.

Content creation tools may range from desktop applications such as Microsoft® Word®; Microsoft® PowerPoint®; Canva®; Adobe® Photoshop®; Adobe® Illustrator®n etc. through to collaborative management tools such as amplify.io; Content Launch; CoMindWare, Trello; and Concept Share. Today, content marketing tools exist for a variety of functions including composing, collaborating, writing, enriching, sourcing, surveys, analytics, advocate marketing, syndicating, social media management, paid promotion, sales enablement, conversion, digital asset management, and auditing as well as integrated content marketing platforms such as Curata™, Compendium™, Percolate™, and Contently™.

However, while all of these tools and platforms are capable of supporting the generation of content for posting to the Internet in a variety of formats including proprietary formats (e.g. Photoshop® 2.0; PowerPoint®.docx; etc.); standards (e.g. Joint Photographic Experts Group (JPEG); Tagged-Image File Format (TIFF); Portable Document Format (PDF)); and those relating to creating web pages (e.g. HyperText Markup Language (HTML); Extensible Markup Language (XML)) etc. they are limited in their ability to acquire, manipulate, and handle dynamic content, live content, and web content.

Accordingly, it would be beneficial to provide users with one or more software-based tools allowing them to acquire, manipulate, and handle content such as dynamic content, live content, and web content either individually or within a collaborative environment.

Other aspects and features of the present invention will become apparent to those ordinarily skilled in the art upon review of the following description of specific embodiments of the invention in conjunction with the accompanying figures.

SUMMARY OF THE INVENTION

Aspects of the present invention mitigate limitations within the prior art relating to content creation and creation management and more particularly to methods and systems for creation and management of dynamic electronic content and/or cloud based electronic content within collaborative content creation tools and environments.

In accordance with an embodiment of the invention, there is provided a method of acquiring a hypertext markup language (HTML) asset stored upon a remote server comprising instantiating a software test framework between an application local for a user and the remote server in dependence upon a uniform resource locator associated with the HTML asset and a request to acquire the HTML asset in response to a request for HTML asset.

In accordance with an embodiment of the invention, there is provided a method comprising receiving within an application in execution upon a computer system a request from a user to acquire a hypertext markup language (HTML)

asset, triggering in response to the request instantiation of a new instance of an acquisition process, and presenting the acquired HTML asset to the user within a graphical user interface associated with the application.

In accordance with an embodiment of the invention, instantiating the new instance of the acquisition process comprises: posting uniform resource locator (URL) data to an application programming interface (API), the URL data entered by the user when generating the request; establishing with the API one or more docker bindings to establish (spin up) a new operating system dependent webdriver container (container) which includes a remote access process which provides accessible remote access ports; establishing all services associated with the new container; instantiating a new webdriver to connect to the container, launch the operating system, launching a browser within the container, and directing the browser to the URL; receiving from the container data relating to a port, Internet Protocol (IP) address, and a container identity referencing the webdriver employed in instantiating the container; launching a frame within the browser pointing to the IP address and port of the remote access process within the container; and in dependence upon an aspect of the requested HTML asset performing either a first process or a second process; wherein the first process comprises requesting a screenshot to capture the HTMP asset; and the second process comprises employing an application to transcode a recording established in dependence upon triggering a start and a stop with respect to a playback of the HTML asset.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 6A to 6C depict the establishment of a session in respect of a web resource and the retrieval of either discrete or multiple static content elements or capture of dynamic audiovisual content via the exemplary architecture established in FIGS. 3 to 4B respectively supporting the handling of web resources within a collaborative content creation environment according to an embodiment of the invention;

FIGS. 7 to 10 depict exemplary screenshots of acquiring an external web resource (XWebR) within a content creation system, application, and platform (CCSAP) according to an embodiment of the invention;

FIGS. 23 and 24 depict the viewing of a clip-based annotation of a XWebR within a CCSAP according to an embodiment of the invention.

DETAILED DESCRIPTION

Figure 1:
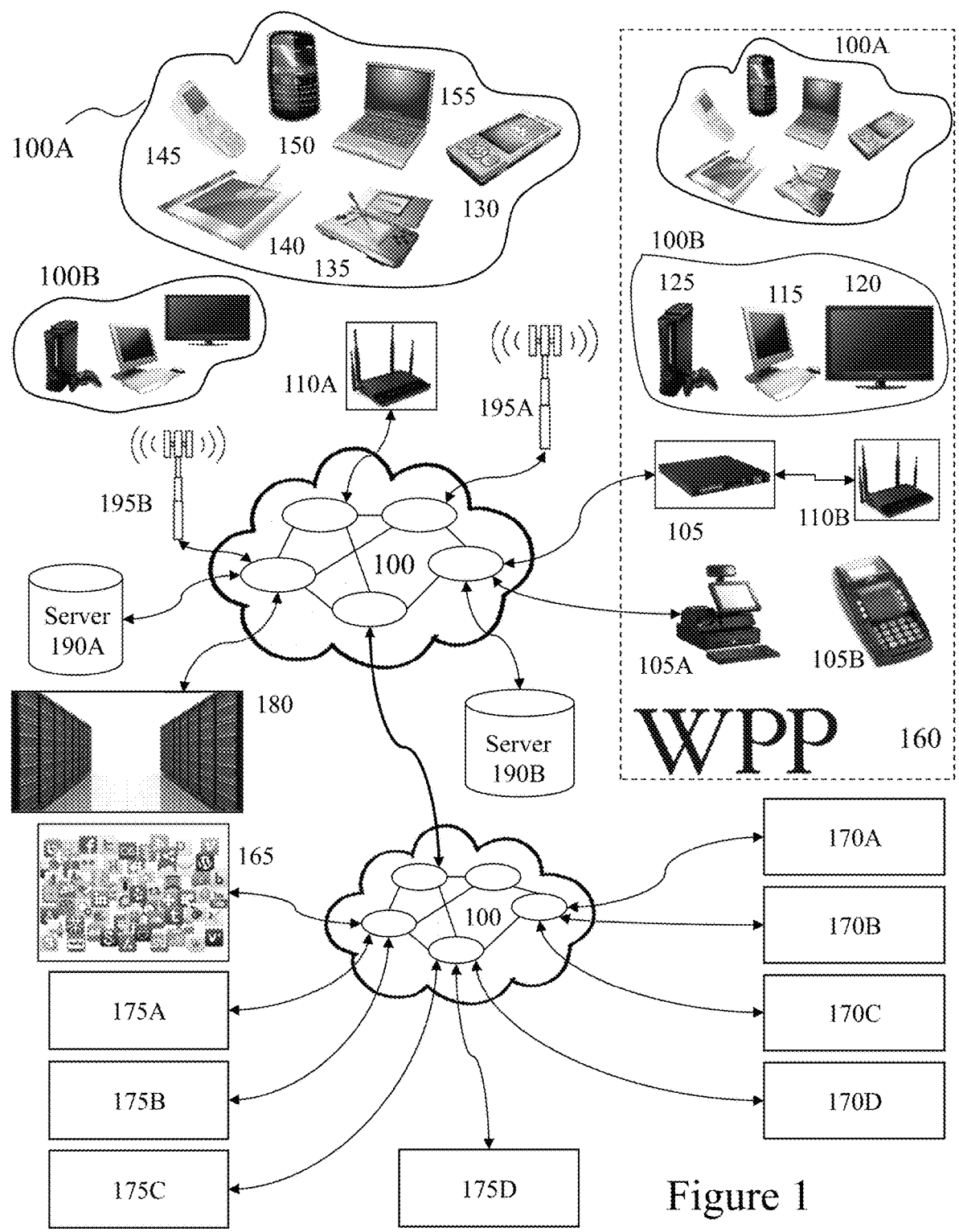
FIG. 1 depicts a network environment supporting embodiments of the invention.

The present invention is direct to content creation and creation management and more particularly to methods and systems for creation and management of dynamic electronic content and/or cloud based electronic within collaborative content creation tools and environments.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" (SOCNET) or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" (SOME) or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowd-sourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterized by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"Content" as used herein may refer to, but is not limited to, information and experiences that are directed towards an end-user or audience by publishing the content or communicating the content. Content may be a single form such as text, audio, and visual or it may be a combination of forms including, for example, audiovisual and multimedia. Content may be published in a variety of formats including, physical media such as newspapers, magazine, books, flyers, posters, etc. and electronic media such as web pages, web sites, digital discs (e.g. CD or DVD), and memory devices (e.g. so called "memory sticks", secure digital (SD) cards, MiniSD cards, MultiMediaCards (MMC), and flash memory) for example. Content itself is what the end-user derives value from and thus, content can refer to the information provided through the medium, the way in which the information was presented, as well as the added features included in the medium in which that information was delivered. The medium, however, typically provides little to no value to the end-user without the information and experiences that make up the content but the channel through which information is delivered, the "medium", affects how the end user perceives content, the "message".

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List of file formats. Within a broader approach digital content mat include any type of digital information, e.g. digitally updated weather forecast, a GPS map, an eBook, a photograph, a video, a Vine™, a blog posting, a Facebook™ posting, a Twitter™ Tweet™, online TV, etc. The digital content may be any digital data that is at least one of generated, selected, created, modified, and transmitted in response to a user request, said request may be a query, a search, a trigger, an alarm, and a message for example.

A "software system" as used as used herein may refer to, but is not limited to, a server based computer system executing a software application or software suite of applications to provide one or more features relating to the licensing, annotating, publishing, generating, rendering, encrypting, social community engagement, storing, merging, and rendering electronic content and tracking of user and social community activities of electronic content. The software system being accessed through communications from a "software application" or "software applications" and providing data including, but not limited to, electronic content to the software application.

A "software application" as used as used herein may refer to, but is not limited to, an application, combination of applications, or application suite in execution upon a portable electronic device or fixed electronic device to provide one or more features relating to one or more features relating to the licensing, annotating, publishing, generating, rendering, encrypting, social community engagement, storing, merging, and rendering electronic content and tracking of user and social community activities of electronic content.

A "plug-in" (plugin, add-in, add-on, or extension) as used herein and throughout this disclosure refers to, but is not limited to, a software component that adds a specific feature to an existing computer program. When a program supports plug-ins, it enables customization. For example, plug-ins in web browsers may add new features such as search-engines, virus scanners, or the ability to use a new file type such as a new video format. For example, well known browser plug-ins include the Adobe Flash Player, QuickTime Player, and the Java plug-in, which can launch a user-activated Java applet on a web page to its execution on a local Java virtual machine. Applications support plug-ins for many reasons including, for example, enabling third-party developers to create abilities which extend an application, easily support adding new features, to reduce the size of an application, and to separate source code from an application because of incompatible software licenses.

A "uniform resource locator" (URL) (also termed a web address) as used herein and throughout this disclosure refers to, but is not limited to, a reference to a web resource that specifies its location on a computer network and a mechanism for retrieving it. A URL is a specific type of Uniform Resource Identifier (URI) and is most commonly used to reference web pages (http), but are also used for file transfer (ftp), email (mailto), database access (JDBC), and many other applications.

"Binding" as used herein and throughout this disclosure refers to, but is not limited to, associating a network socket with a local port number and Internet Protocol (IP) address.

A "network socket" (commonly referred to as a socket) as used herein and throughout this disclosure refers to, but is not limited to, an internal endpoint for sending or receiving data at a single node in a computer network. Concretely, it is a representation of this endpoint in networking software (protocol stack), such as an entry in a table (listing communication protocol, destination, status, etc.), and is a form of system resource. Sockets are local (specific to one node): they are local resources and cannot be referred to directly by other nodes, unlike ports. Further, sockets are not necessarily associated with a persistent connection (channel) for communication between two nodes, nor is there necessarily some single other endpoint. Typically, a socket refers to a socket in an Internet Protocol (IP) network and particularly for the Transmission Control Protocol (TCP). Sockets are assumed to be associated with a specific socket address, namely the IP address and a port number for the local node, and there is a corresponding socket address at the foreign node (other node), which itself has an associated socket, used by the foreign process. Associating a socket with a socket address is called binding.

A "portable software-testing framework" (PSTF) as used herein and throughout this disclosure refers to, an environment for the automation test scripts to be executed. With the use of framework, users can efficiently work with the automation test scripts, including development, execution, and reporting. for web applications. A portable software testing framework for web (browser) applications allows a user to express the tests in HTML tables or code them in a number of programming languages. Accordingly, as the intent is to trigger an action and record a resulting action for verification a PSTF provides a mechanism for capturing content on web browsers by employing a browser-specific browser driver, which sends commands to a browser, and retrieves results. In fact, browser drivers may launch and access a browser application, e.g. Firefox™, Chrome™, Internet Explorer™, or Microsoft™ Edge.

A "docker service" as used herein and throughout this disclosure refers to, but is not limited to, a software technology providing containers which provides an additional layer of abstraction and automation of operating-system-level virtualization (also known as containerization). Operating-system-level virtualization, refers to an operating system feature in which the kernel allows the existence of multiple isolated user-space instances. Such instances, called containers, partitions, virtualization engines (VEs) or jails, may look like real computers from the point of view of programs running in them but these programs running inside a container can only see the container's contents and devices assigned to the container rather than the entire system. With operating-system-virtualization, or containerization, it is possible to run programs within containers, to which only parts of these resources are allocated. A program expecting to see the whole computer, once run inside a container, can only see the allocated resources and believes them to be all that is available. Several containers can be created on each operating system, to each of which a subset of the computer's resources is allocated. Each container may contain any number of computer programs. These programs may run concurrently or separately, even interact with each other.

"Remote computer access" as used herein and throughout this disclosure refers to, but is not limited to, a computer software and/or software application providing remote connectivity and network computing software. Such software provides a Virtual Networking Computing (VNC) client and may be installed on Windows®, Mac®, Linux® and Linux® ARM, with connecting clients available for Windows®, Mac OS X®, iOS®, Android®, Linux®, Linux®ARM and HTML/JavaScript permitting access from any device or computer. Its features include sharing network devices, session recording, file transfer, multi-media capability and browser-based access.

"Virtual Network Computing" (VNC) as used as used herein may refer to, but is not limited to, a graphical desktop sharing system which exploits a protocol, e.g. a Remote Frame Buffer protocol (RFB), to remotely control another computer. A VNC transmits "user generated events" such as keyboard and mouse events from one computer to another and relays back the graphical screen updates back in the other direction, over a network. A VNC is typically platform independent with clients and servers supporting many GUI-based operating systems and Java.

"NoVNC" as used herein may refer to, but is not limited to, a browser based VNC client. For example, NoVNC may be implemented using HTML5 (fifth and current version of HyperText Markup Language (HTML)) and particularly its Canvas element together with Web Sockets. Canvas accordingly as used herein may refer to, but is not limited to, software providing dynamic, scriptable rendering of 2D shapes and bitmap images while WebSockets as used herein may refer to, but is not limited to, a computer communications protocol, providing full-duplex communication channels over a single TCP connection. Such software may include, but not be limited to, NoMachine (employing NX technology), TurboVNC, TeamViewer, DWService, and IBM Director Remote Control.

"Primary content" as used herein and throughout this disclosure refers to, but is not limited to, electronic content generated by an author and/or published by a publisher and/or user with or without content digital rights which is made available through a software system to a user via a software application with a procurement process that may or may not require a financial transaction between the user and a provider of the primary content. The provider may be the author, publisher, an operator of the software system, or a third party engaged by one or more of the preceding. The primary content may include one or more of text, characters, audiovisual content and multimedia content relating to an author or authors relating to a subject or subjects. Examples of primary content may include e-books and other electronic documents including, but not limited to, novels, manuals, user guides, reference materials, reviews, specialist subject materials, journals, newspapers, music, movies, cartoons, videos, television programming, brochures, and software.

"Secondary content" as used herein and throughout this disclosure refers to, but is not limited to, electronic content generated by a user with or without digital rights which is made available through available through a software system to a user via a software application with or without user digital rights associated with said secondary content. Said user digital rights relating to the predetermined portion of a community of users of the software system/software application that may view the secondary content generated by the user. The secondary content may include one or more of text, characters, audiovisual content and multimedia content.

A "publisher" as used herein and through this disclosure refers to, but is not limited to, an enterprise, organization, or user engaged in publishing through performing one or more stages of the development, acquisition, copyediting, graphic design, production, release, and marketing and distribution of electronic content, referred to in this specification as primary content. Typically, publishers acquire content from authors, but authors may be their own publishers, meaning, originators and developers of electronic content can also deliver the electronic content for the same.

An "author" as used herein and through this disclosure refers to, but is not limited to, an individual, group of individuals, or user who originate or give existence to anything that may be considered electronic content and their authorship determines responsibility for what is created. More traditionally an author is the originator of any written work which may be represented electronically as electronic content. However, an author may originate through one or more of text, characters, audiovisual content and multimedia content.

Referring to FIG. 1 there is depicted a network environment 100 within which embodiments of the invention may be employed supporting content creation systems, applications, and platforms (CCSAPs) according to embodiments of the invention. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, such as WPP™ for example, within which other first and second user groups 100A and 100B are disposed. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A.

Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are:
Social Networks (SOCNETS) 165;
First content creator 170A, for example an advertising agency such as WPP, Omnicom, Publicis Groupe, Dentsu, etc.;
Second content creator 170B, for example Procter & Gamble™, Johnson & Johnson™, Nike™, Influence & Co.™, Advance Publications™, Asahi Shimbun Company, etc.;
Online retailer 170C, for example Amazon™, iTunes™, Virgin™, etc.;
Retailer 170D, for example WalMart™, Carrefour SA™, Amazon™, Walgreens Boots Alliance Inc.™, etc.;
Website 175A, for example YouTube™, Google™, Yahoo™ etc.;
Service provider 175B, for example BT™, Verizon™, DoCoMo™, etc.;
Third party service provider 175C, for example Rogers™, EE™, Comcast™, etc.;
Enterprise 175D, for example Apple™, Microsoft™, etc.; and First and second servers 190A and 190B which together with others, not shown for clarity.

Accordingly, a user employing one or more CCSAPs may interact with one or more such providers, enterprises, service providers, retailers, third parties etc. and other users. First and second servers 190A and 190B may host according to embodiments of the inventions multiple services associated with a provider of content creation systems, applications, and platforms (CCSAPs); a provider of a SOCNET or Social Media (SOME) exploiting CCSAP features; a provider of a SOCNET and/or SOME not exploiting CCSAP features; a provider of services to PEDS and/or FEDS; a provider of one or more aspects of wired and/or wireless communications; an Enterprise 160 exploiting CCSAP features; license databases; content databases; image databases; content libraries; customer databases; websites; and software applications for download to or access by FEDs and/or PEDs exploiting and/or hosting CCSAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading an application which provides CCSAP features according to embodiments of the invention; execute an application already installed providing CCSAP features; execute a web based application providing CCSAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
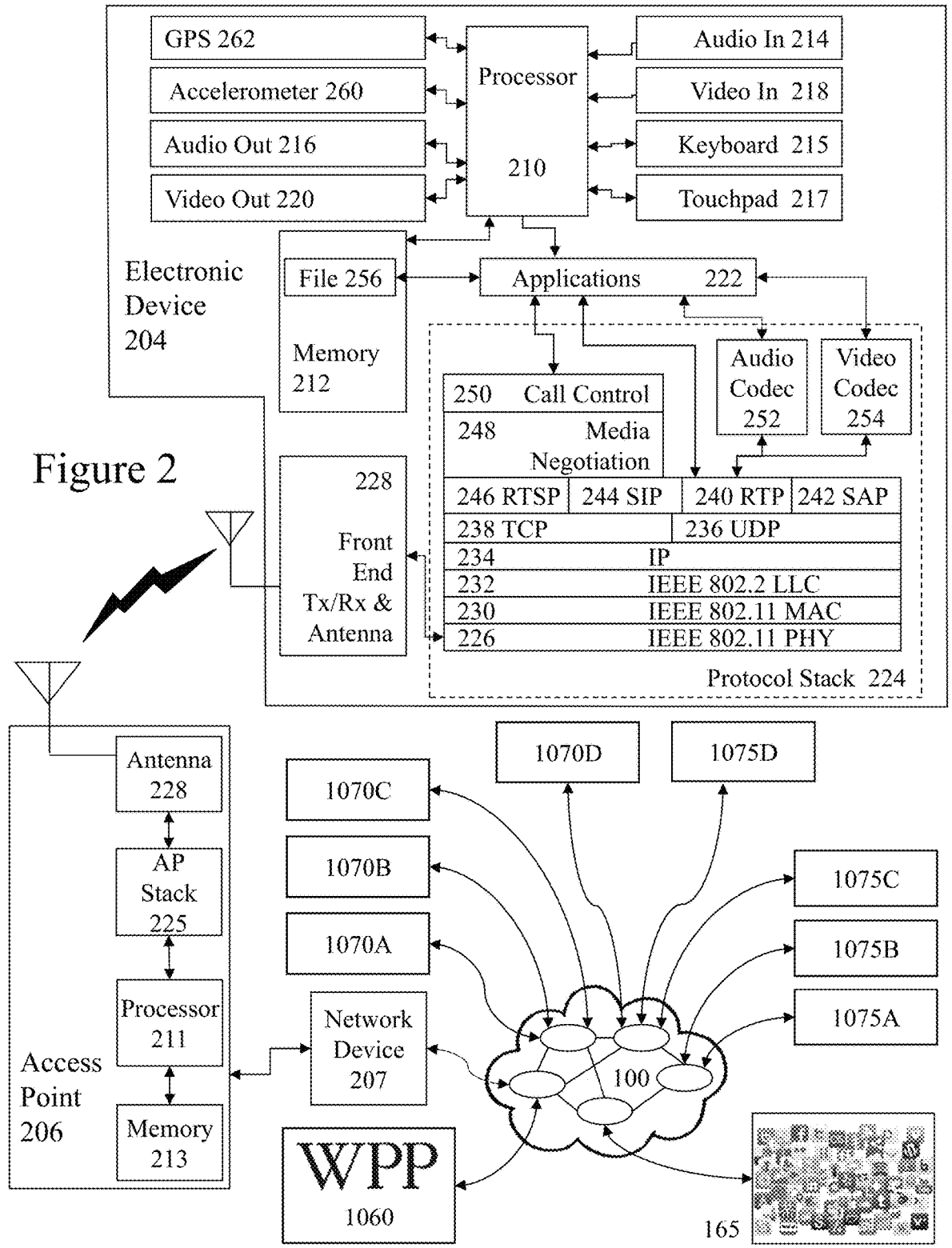
FIG. 2 depicts an electronic device supporting embodiments of the invention.

Now referring to FIG. 2 there is depicted an electronic device 204 and network access point 207 supporting CCSAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated.

Also connected to the network 100 are:
Social Networks (SOCNETS) 165;
First content creator 170A, for example an advertising agency such as WPP, Omnicom, Publicis Groupe, Dentsu, etc.;
Second content creator 170B, for example Procter & Gamble®, Johnson & Johnson®, Nike®, Influence & Co.®, Advance Publications®, Asahi Shimbun Company, etc.;
Online retailer 170C, for example Amazon®, iTunes®, Virgin®, etc.;
Retailer 170D, for example WalMart®, Carrefour SA Amazon®, Walgreens Boots Alliance Inc., etc.;
Website 175A, for example YouTube®, Google®, Yahoo® etc.;

Service provider 175B, for example BT®, Verizon®, DoCoMo®, etc.;

Third party service provider 175C, for example Rogers™, EE™, Comcast®, etc.;

Enterprise 175D, for example Apple®, Microsoft®, etc.; and

First and second servers 190A and 190B which together with others, not shown for clarity.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Tx/Rx & Antenna Circuits 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238. Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206.

Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230. It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Also depicted is ASsociated DEVice (ASDEV) 270 which is coupled to the electronic device 204 through a wireless interface between Antenna 272 and Tx/Rx & Antenna Circuits 228 wherein the electronic device 204 may support, for example, a national wireless standard such as GSM together with one or more local and/or personal area wireless protocols such as IEEE 802.11 a/b/g WiFi, IEEE 802.16 WiMAX, and IEEE 802.15 Bluetooth for example. The Antenna 272 is connected to Processor 274 and therein to Memory 276, Drivers 278, and Features 280. Accordingly, the ASDEV 270 may operate as standalone device with factory installed control routines accessed through an interface on the ASDEV 270, not shown for clarity, or through an application in execution upon the electronic device 204. Subsequently, as described below one or more of these control routines may be modified, amended, deleted etc. while other new control routines may be created, acquired, installed etc.

Accordingly, it would be evident to one skilled the art that the ASDEV 270 with associated electronic device 204 may accordingly download original software and/or revisions for a variety of functions supported by the drivers 278 and/or features 280. In some embodiments of the invention the functions may not be implemented within the original as sold ASDEV 270 and are only activated through a software/firmware revision and/or upgrade either discretely or in combination with a subscription or subscription upgrade for example.

Referring to FIGS. 3 to 6 there are depicted exemplary architectures supporting the handling of web resources within a collaborative content creation environment according to an embodiment of the invention. In contrast to the prior art wherein an item of content during the creation process was stored and manipulated locally embodiments of the invention support the creative content creation process upon any item of content accessible from a content creation system, application, and platform (CCSAP) according to an embodiment of the invention. Accordingly, embodiments of the invention may be viewed as part of a CCSAP exploiting embodiments of the invention or they may be viewed as a discrete application interfaced to a prior art CCSAP or a plugin expanding the functionality and features of a CCSAP according to the prior art. Each architecture depicted within FIGS. 3 to 6 relates to how web content "screenshots" and "videos" are acquired and fed into content creation software tool or suite such as ConceptShare. ConceptShare by Concept Share Inc. of Ottawa, Ontario, Canada provides enterprises, organizations, users etc. with a content creation environment that allows for brand and marketing compliance management by creative teams working within regulated as well as unregulated industries. Importantly, ConceptShare allows teams to work smarter, faster, and better while recognizing that "silos" kill productivity, create delays, and are frustrating for others to deal with. Accordingly, ConceptShare can be employed as a standalone web-based content proofing and approvals solution or it may be integrated with software tools from a range of partner software providers relating to project management, digital asset management, etc.

In addition to the embodiments of the invention described and depicted below the inventors have established alternate solutions including, but not limited to:

Establishing a browser plugin;
Establishing an interactive hub wherein acquired content is transferred to the interactive hub, stored, and accessed thereby providing a "single source of truth" as only the content upon the interactive hub is valid; and
Directly capturing the user's browser tab, which in some browsers requires a plugin to achieve this, although this is limited benefit.

However, these suffer drawbacks against the embodiments of the invention described and depicted below in respect of FIGS. 3 to 6 respectively. Beneficially, the embodiments of the invention provide for:

A solution that meets the target user experience requirements established for a process not exploiting a plug-in compatible with existing content creation/audit/approval/review/asset management tools.
Ability to support both server side screenshot acquisition and video recording;
Ability to view URLs even where X-Frame-Options such as DENY, SAMEORIGIN and ALLOW-FROM are set to prevent a browser rendering the webpage;
Not be a plugin.
Support scaling.
Provide a single source of truth.
Support Enterprise level hosting.
Support emerging media formats/types such as video games, mobile applications, virtual reality/augmented reality etc.

Optionally, this may be embodied using three primary elements:

Docker software, such as Docker™
WebDriver, such as Selenium™; and
Virtual Network Computing (VNC) software.

Embodiments of the invention have been implemented by the inventors using:

noVNC, a browser based VNC client implemented using HTML5 technologies (Web Sockets, Canvas) with encryption (wss://) support; and NoMachine, a server based remote connectivity and network computing software suite exploiting a proprietary compression protocol.

While these and other Remote Computer Access tools may be employed there is benefit in exploiting a solution that can be installed upon multiple platforms including those based upon Windows, Mac, Linux and Linux ARM while connecting with clients exploiting Windows, Mac OS X, iOS, Android, Linux, Linux ARM and HTML/JavaScript thereby permitting access from any device or computer. Further, it would be beneficial for the Remote Computer Access software to be environment-agnostic allowing it to operate with any physical, virtualized or in the cloud infrastructures such that it can be, for example, installed on Linux, Windows and Mac instances virtualised on top of popular hypervisors (virtual machine monitor or VMM) or integrated with any Virtual Desktop Infrastructure running in private or public clouds. Based upon this and its enhanced performance the inventors have exploited NoMachine and its NX technology generally in developing the embodiments of the invention.

Figure 3:
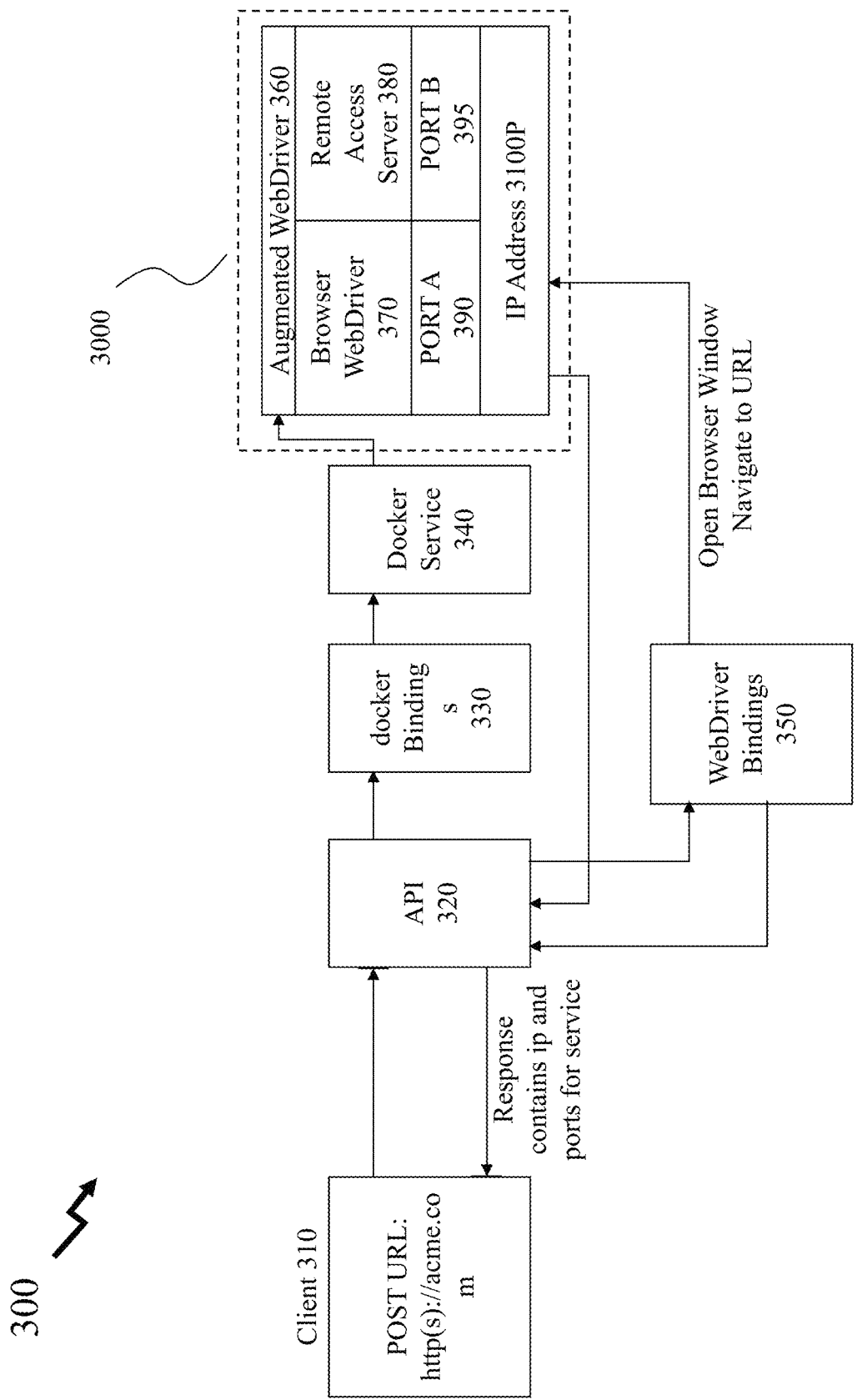
FIG. 3 depicts an exemplary architecture supporting the initial establishment of a new instance of accessing a web resource within a collaborative content creation environment according to an embodiment of the invention via a WebDriver

Accordingly, FIG. 3 depicts an exemplary architecture 300 supporting the establishment of a new instance of accessing a web resource within a collaborative content creation environment according to an embodiment of the invention via a WebDriver. As depicted a Client 310 defines a uniform resource locator (URL) relating to an item of content they wish to retrieve, e.g. http://acme.com or https://acme.com for example. This is then passed to an Application Programming Interface (API) 320 which processes the URL and establishes bindings, Docker Bindings 330, for a Docker Service 340 which establishes a web driver interface, Augmented WebDriver 360. The API 320 also establishes a second set of bindings, WebDriver Bindings 350, which are employed to open a browser window and navigate to the requested URL established by the Client 310. The requested URL is associated with an IP Address 3100 (e.g. IPv4 xxxx.xxxx.xxxx.xxxx or IPv6 xxxx.xxxx.xxxx.xxxx.xxxx.xxxx.xxxx.xxxx) which is a numerical label assigned to each device connected to a computer network using the Internet Protocol for communications and which serves two principal functions, namely host or network interface identification and location addressing.

The Augmented WebDriver 360 establishes a Browser WebDriver 370 and a Remote Access Server 380 wherein communications are established via Port A 390 and Port B 395. Accordingly, the Client 310 receives a response identifying the port employed, the Internet Protocol mappings of the URL, and a container ID referencing the web driver employed established by the Docker Service. These being communicated from the API 320 based upon responses it receives from the WebDriver Bindings 350 and IP Address 3100.

The Augmented WebDriver 360, Browser WebDriver 370, Remote Access Server 380, Port A 390, Port B 395 representing a Remote Targeted Web Resource 3000.

Figure 4A:
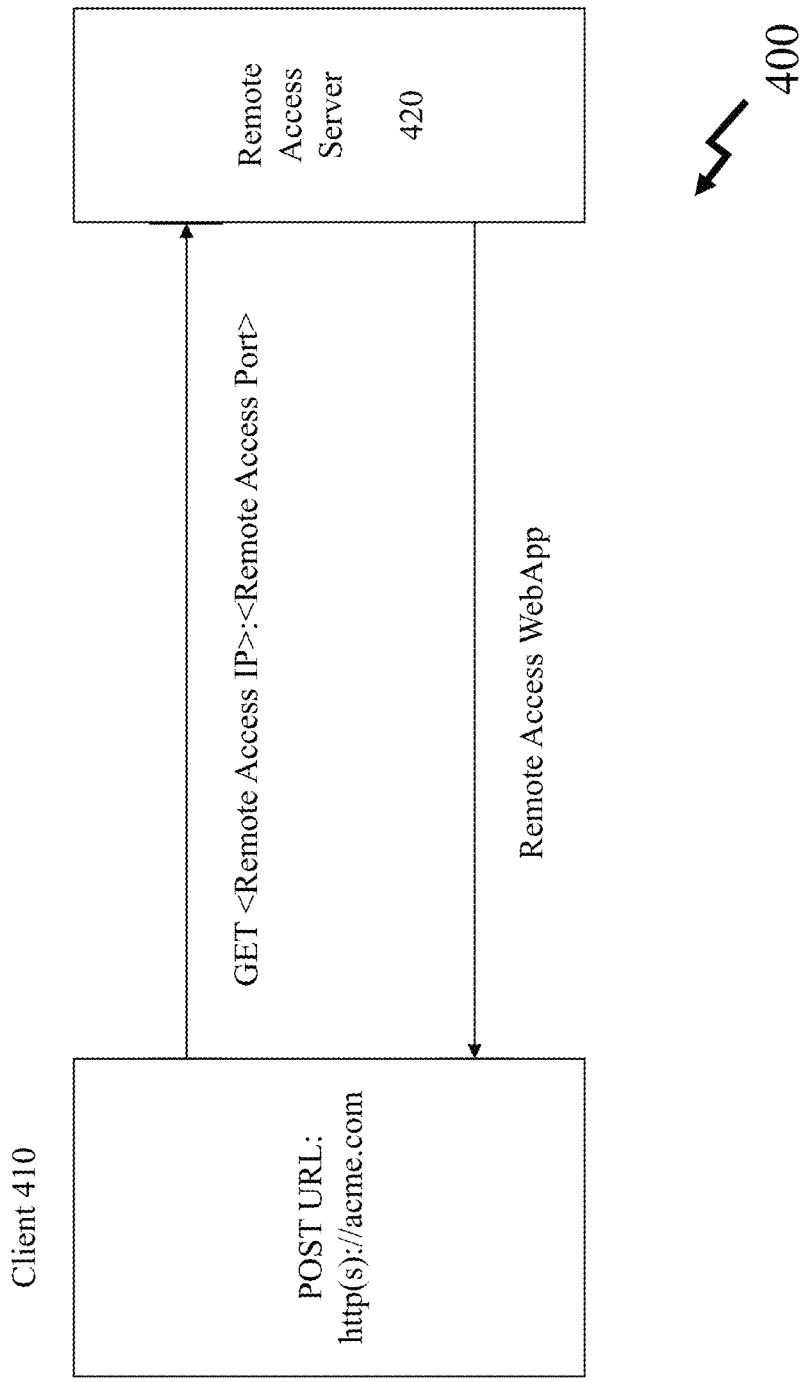
FIG. 4A depicts an exemplary architecture supporting the accessing of a virtual display device to obtain content via a WebDriver handling of web resources within a collaborative content creation environment according to an embodiment of the invention.

Subsequently, the user exploits the exemplary architecture 400 as depicted in FIG. 4 for supporting the accessing of a virtual display device to obtain content via a WebDriver handling of web resources within a collaborative content creation environment according to an embodiment of the invention. Exemplary architecture 400 being a defined subset of exemplary architecture 300 in FIG. 3. As depicted Client 410 posts the URL they wish to access, e.g. hap(s)://acme.com; wherein a request is sent to the Remote Access Server 420, for example GET <Remote Access IP><Remote Access Port> thereby triggering the establishment of a Remote Access WebApp which communicates back to the Client 410.

Within FIG. 3 reference is made to Port A 390 and Port B 395. These, may for example, be a port exploiting the Transmission Control Protocol (TCP) which is one of the main protocols in TCP/Internet Protocol (IP) networks as while the IP protocol deals only with packets, TCP enables two hosts to establish a connection and exchange streams of data. TCP further guarantees delivery of data and that packets will be delivered in the same order that they are sent. This guaranteed communication over the port is the key difference between TCP and User Datagram Protocol (UDP). Within embodiments of the invention Port A 390 may equate with Port 4444 and Port B 395 may be equated with Port 4443.

Figure 4B:
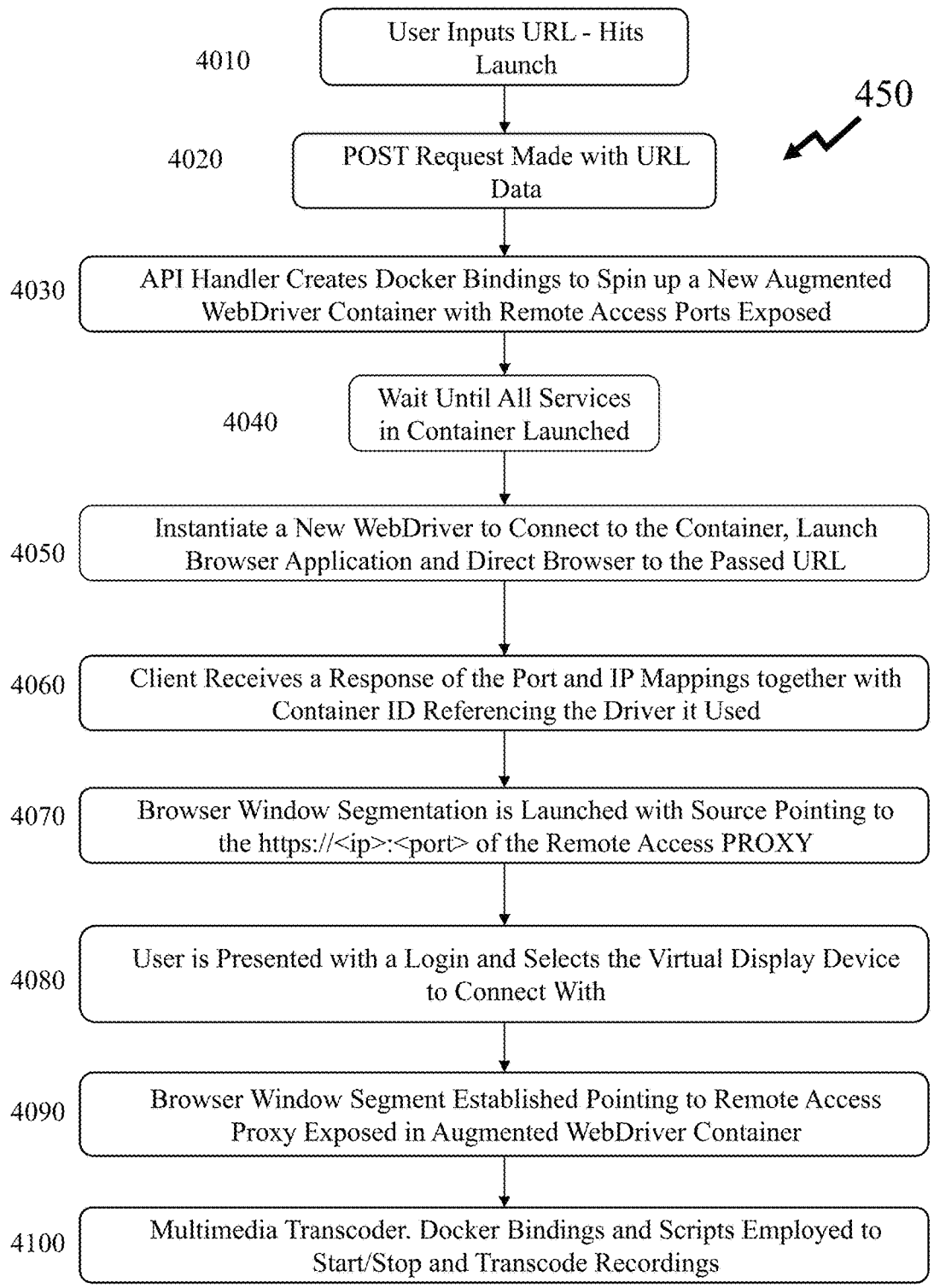
FIG. 4B depicts an exemplary process flow for accessing a web resource within a collaborative content creation environment according to an embodiment of the invention.

Now referring to FIG. 4B there is depicted an exemplary process flow 450 relating to accessing a web resource within a collaborative content creation environment according to an embodiment of the invention. Accordingly, process flow 450 comprises steps 4010 to 4100 respectively which comprise:

Step 4010: User inputs the URL they wish to access and selects "launch."
Step 4020: A "POST" request is made with URL data.
Step 4030: The API handler creates docker bindings to establish (or spin up) a new augmented webdriver browser container with its remote access ports exposed.
Step 4040: The process waits while all services within the container have launched/
Step 4050: The process then instantiates a new webdriver to connect to the container, launch the browser and direct the browser to the passed URL.
Step 4060: The process then receives a response comprising the exposed port(s) and IP mappings of the established (or spun up) container together with a container ID referencing the driver employed.
Step 4070: Browser window segmentation is launched, for example using HTML iFrame, with the source pointing to the https://<ip>:<port> of the remote access PROXY.
Step 4080: The user is presented with a login, for example through an access control list (ACL), for example using an UNIX ACL, to provide permissions to the resource, for example using NoMachine™ for remote access would yield a command adduser -G nomachine <newuser>.
Once granted access the user then selects the virtual display device they want to connect with.
Step 4090: The process establishes a browser window segment, e.g. using HTML iFrame, which points to the remote access proxy which is exposed within the augmented webdriver container.
Step 4100: With the browser window segment established the URL content can be acquired using, for example, a multimedia transcoder, docker bindings and script(s). An example of a multimedia transcoder providing a cross-platform solution for recording, converting, and streaming audio/video content being FFmpeg which provides command line tools for format conversion, multimedia streaming server, media player and media information extraction.

Figure 5A:
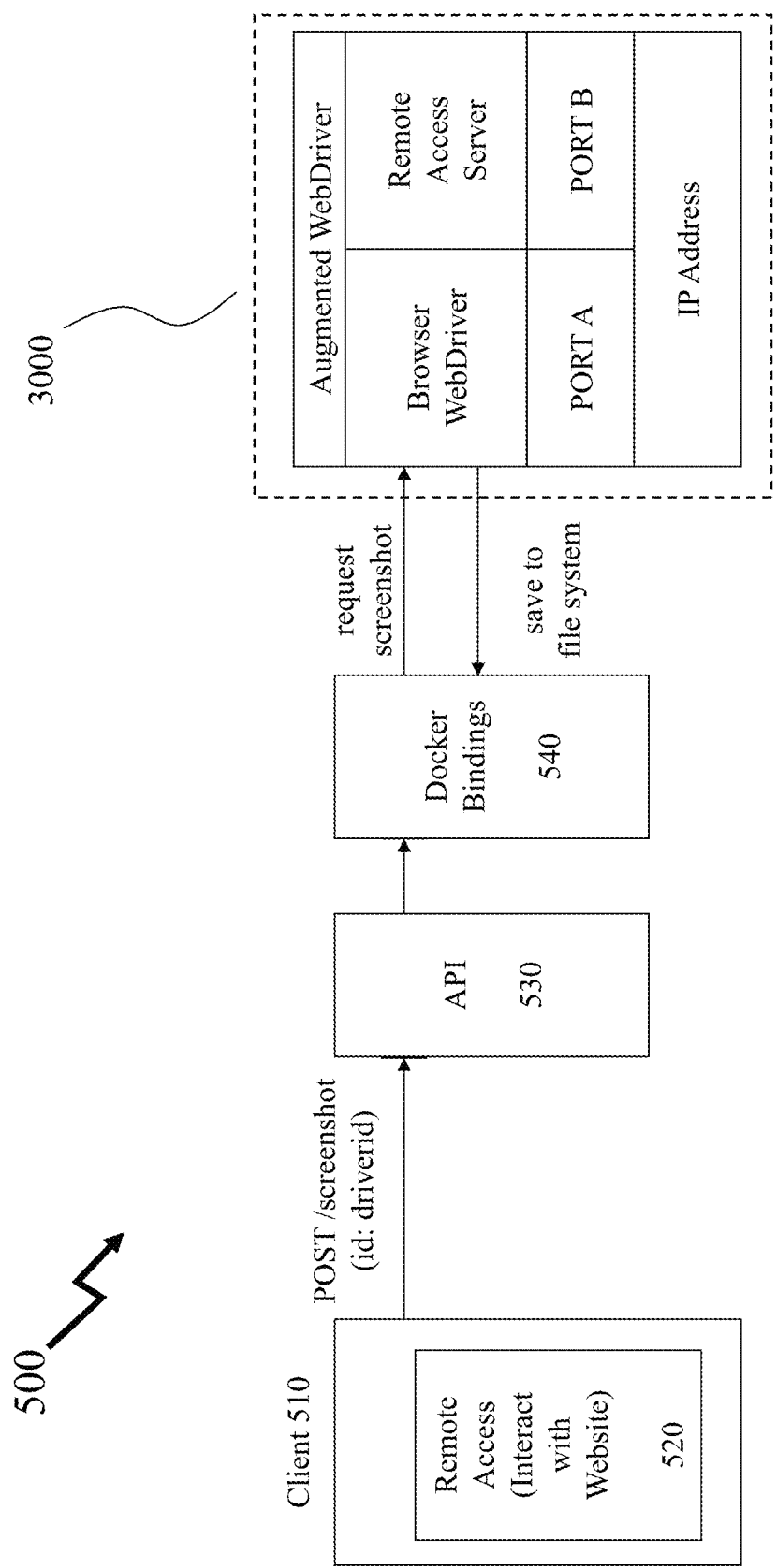
FIGS. 5A and 5B depict the retrieval of a discrete content element or multiple associated content elements via the exemplary architecture established in FIGS. 3 to 4B supporting the handling of web resources within a collaborative content creation environment according to an embodiment of the invention.
Figure 5B:
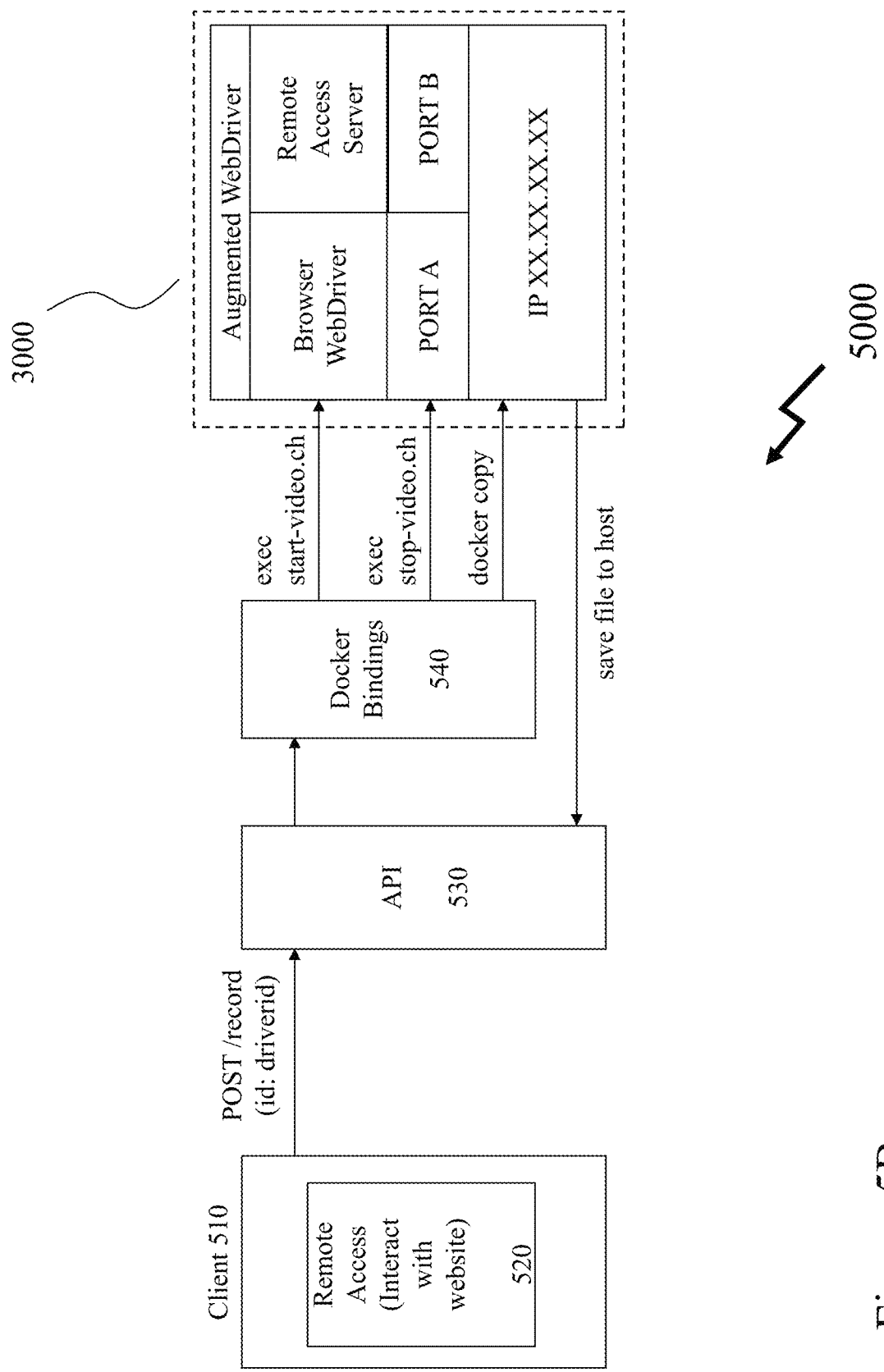

FIGS. 5A and 5B depict the retrieval of a discrete content element or multiple associated content elements via the exemplary architecture established in FIGS. 3 and 4 supporting the handling of web resources within a collaborative content creation environment according to an embodiment of the invention. Accordingly, referring to FIG. 5 with discrete content retrieval architecture 500 the Client 510 establishes a remote access interaction with the website of interest via a process depicted by Remote Access 520 which posts a request to acquire a browser screenshot with the identity of the container established as the part of the response within exemplary architecture 300 in FIG. 3; POST/screenshot (id: driverid). This post is received by the API 530 and therein the Docker Bindings 540 are established before the request for the screenshot is provided to the Remote Targeted Web Resource 3000 which then provides as a response the requested screenshot as a save to the file system.

Alternatively, in dynamic content retrieval architecture 600 in FIG. 5B the Client 510 establishes a remote access interaction with the website of interest via a process depicted by Remote Access 520 which posts a request to acquire a dynamic segment with the identity of the container established as the part of the response within exemplary architecture 300 in FIG. 3; POST/record (id: driverid). This post is received by the API 630 triggering the generation of the Docker Bindings 630. However, now the process triggers several commands to the Remote Targeted Web Resource 3000 in respect of starting the browser "playback" (exec start-video.ch) and stop the browser "playback" (exec stop-video.ch) together with a docker copy command. The result is the Remote Targeted Web Resource 3000 created a copy of the played back browser content which is then transferred via the API 530 for storage to the host.

Figure 6A:
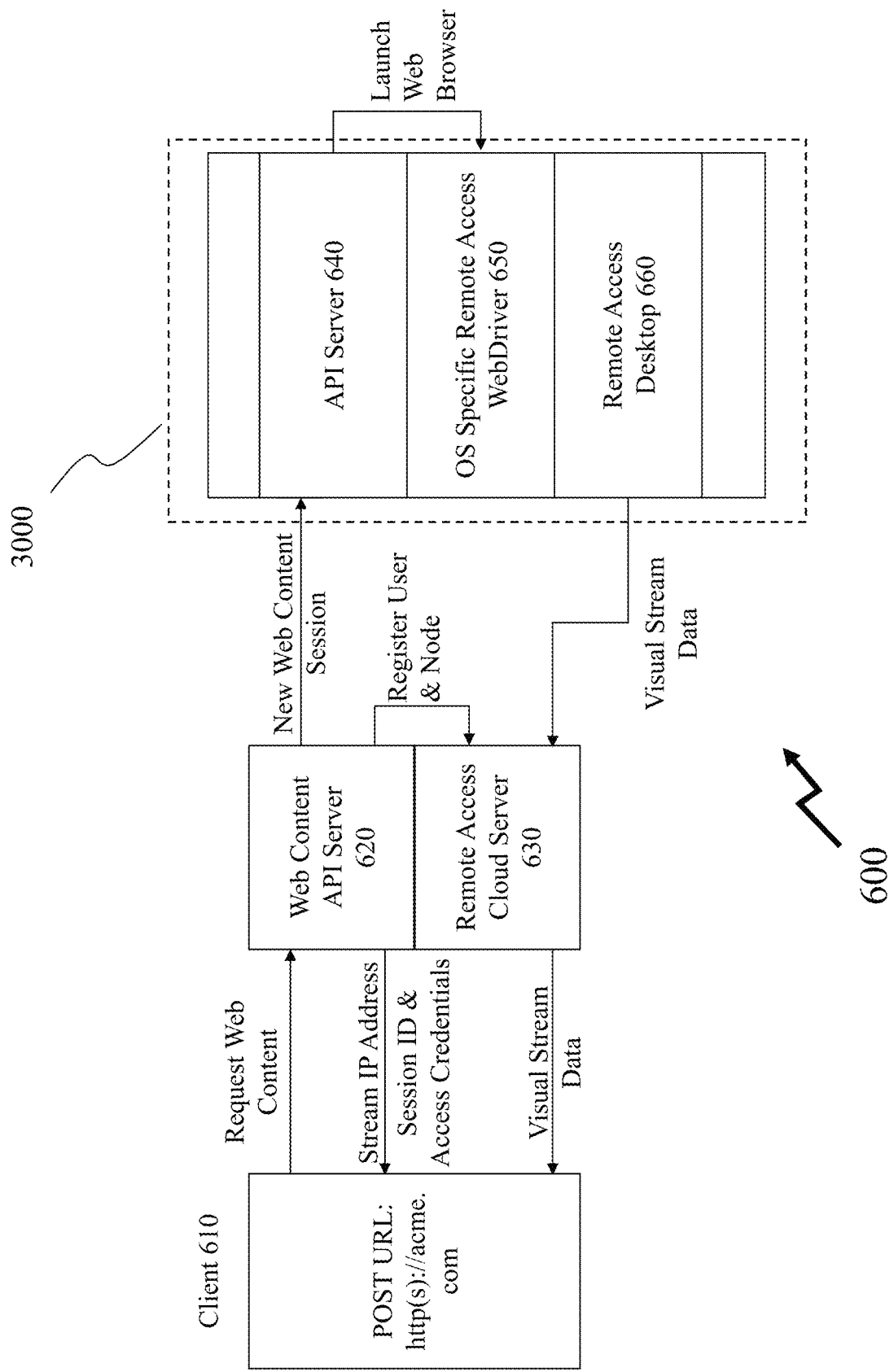
Figure 6C:
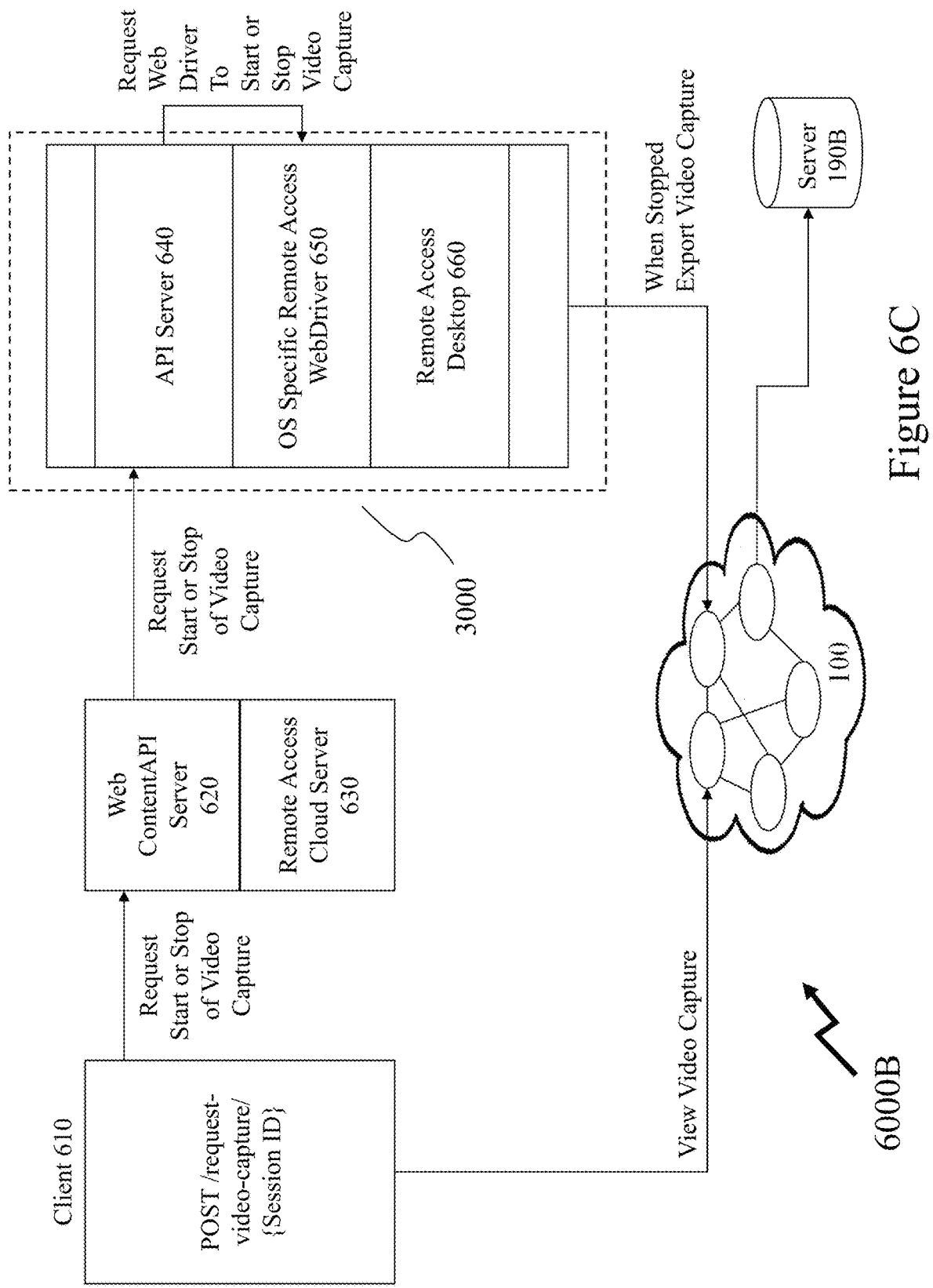
Figure 7:
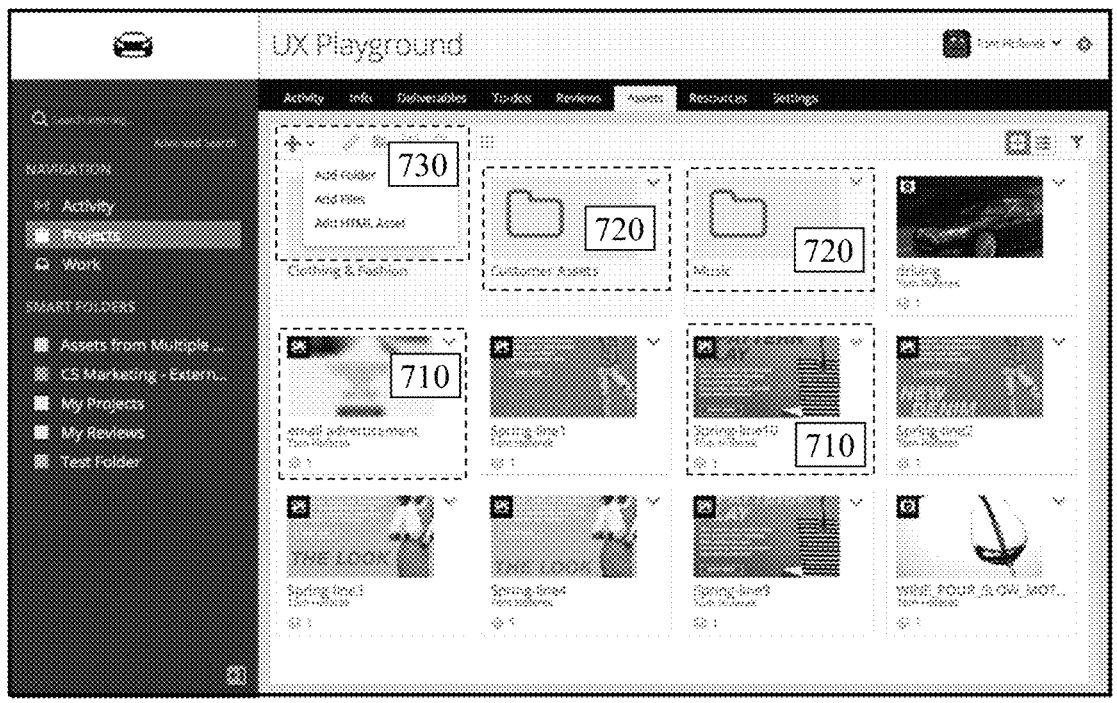

FIGS. 6A to 6C respectively depict retrieval of content elements via a variant of the exemplary architecture established in FIGS. 3 to 4B respectively supporting the handling of web resources within a collaborative content creation environment according to an embodiment of the invention. Accordingly, referring to FIG. 6A there are depicted the Client 610 which transmits a request for web content based upon the user's actions within the collaborative content creation environment and their specifying web content to be captured/copied, e.g. by entry of a URL such as http:// acme.com for example. This request is parsed by Web Content API Server 620 which generates a request for a new web content session to the Remote Targeted Web Resource 3000 and a request to register a user and a node with a Remote Access Cloud Service 630. The Remote Targeted Web Resource 3000 within this variant architecture comprising an API Server 640, WebDriver 650 and Remote Access Desktop 660. Based upon the received web content session request the API Server 640 launches a web browser via WebDriver 650. The Remote Access Desktop 660 generates visual stream data from the target URL to the Client 610 via the Remote Access Cloud Service 630. The WebDriver 650 may be browser specific, e.g. Google Chrome®.

Accordingly, the user (Client 610) is now accessing the web site remotely within the collaborative content creation environment and viewing it live. Accordingly, video, ticker tape displays, etc. are all transferred and rendered to the user. This is facilitated by the Web Content API Server 620 returning a streaming IP address session ID and access credentials for the Client 610 to employ in accessing the visual data stream from the linked web content returned from the Remote Access Desktop 660 via the Remote Access Cloud Service 630.

Subsequently, in FIG. 6B the user to triggers a request for a screenshot which is transmitted to the API Server 640 within Remote Targeted Web Resource 3000 via Web Content API Server 620 which triggers a request from the API Server 640 to the operating system specific Remote Access WebDriver 650 to capture the screen which is then transferred to a remote Server 190B via Network 100 by the Remote Access Desktop 660. The user can then access the screen capture from Client 610 through the collaborative content creation environment which accesses the stored content on the remote Server 190B.

With respect to video content rather than "static" screenshot then as depicted in FIG. 6C the user via Client 610 the requests to start or stop the capture are transmitted to the API Server 640 within Remote Targeted Web Resource 3000 via Web Content API Server 620 which triggers a request from the API Server 640 to the operating system specific Remote Access WebDriver 650 to similarly start or stop the video capture wherein once stopped the captured video is then transferred to the remote Server 190B via Network 100 by the Remote Access Desktop 660. The user can then access the stored video content from Client 610 through the collaborative content creation environment which accesses the stored video content on the remote Server 190B.

Now referring to FIGS. 7 to 10, these figures depict exemplary screenshots of acquiring an external web resource (XWebR) within a content creation system, application, and platform (CCSAP) according to an embodiment of the invention are depicted. The exemplary processes described and depicted with respect to FIGS. 3 to 6 representing an embodiment of the invention may, for example, be executed in response to the user actions performed within the graphical user interface (GUI) of the CCSAP. Accordingly, in FIG. 7 a user has accessed a CCSAP tool and navigated to a projects page 700 wherein they are presented with thumbnails of projects acquired and/or generated including, for example, "email advertisement" and "Springline10". Also displayed are folders 720 of stored assets and/or projects including "Customer Assets" and "Music." The user has selected a drop down menu 730 allowing them to add a folder, add files, or add an HTML asset. The projects page 700 including a search interface, navigation defaults such as "Activity", "Projects". and "Work" as well as "Smart Folders."

Figure 8:
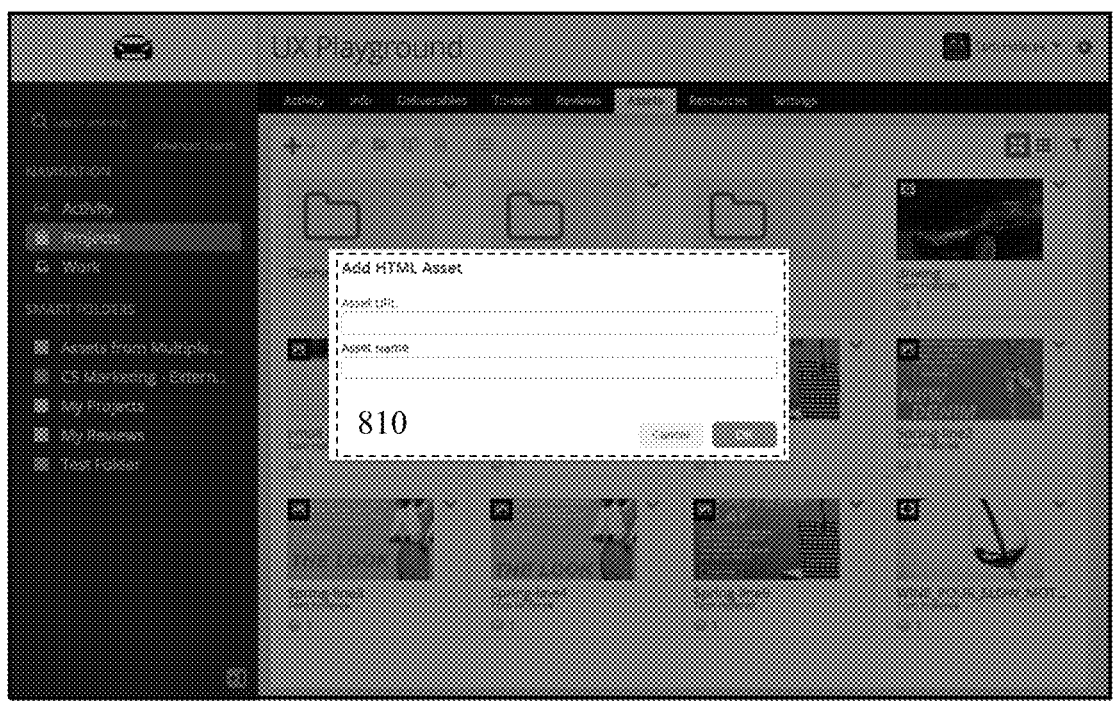

If the user selects "Add HTML Asset" in drop down menu 730 then as depicted in GUI 800 in FIG. 8 a pop-up 810 is triggered wherein the user enters the asset URL and associates an asset name to the asset that they wish to acquire. Upon completion of these fields and selecting "OK" the CCSAP according to an embodiment of the invention executes am XWebR retrieval process such as that described and depicted in respect of FIGS. 3 to 4B respectively and either that of FIG. 5 or FIG. 6 according to whether static (e.g. screenshot) or dynamic (e.g. video, audio, multimedia, streaming content etc.). The acquired XWebR HTML asset is then displayed within GUI 900 of FIG. 9 within the accessible assets as Asset 910. As depicted the Asset 910 comprises a thumbnail of the asset together with its title, a page count indicator, a user identity and a "cloud" icon indicating that the Asset 910 was acquired as an HTML asset.

FIG. 10 depicts the acquired XWebR asset 1020 with the GUI 1000 of a CCSAP according to an embodiment of the invention based upon selecting and opening the HTML asset within the GUI 900. Accordingly, the user has elected to open in "Responsive" mode wherein they are presented with the URL 1010, Identity 1020, and Image 1030. Image 1030 depicts the XWebR asset 1020 using a "Responsive Viewport" mode which provides for a freely resizable viewport through the "handles" on either side of the viewport. The URL 1010 indicates that the content is "LIVE" while the identity 1020 indicates that the viewer is viewing the "Current" asset rather than a previous draft. Accordingly, the "LIVE" indicates that to the viewer that the acquired content was retrieved from a live URL.

Figure 11:
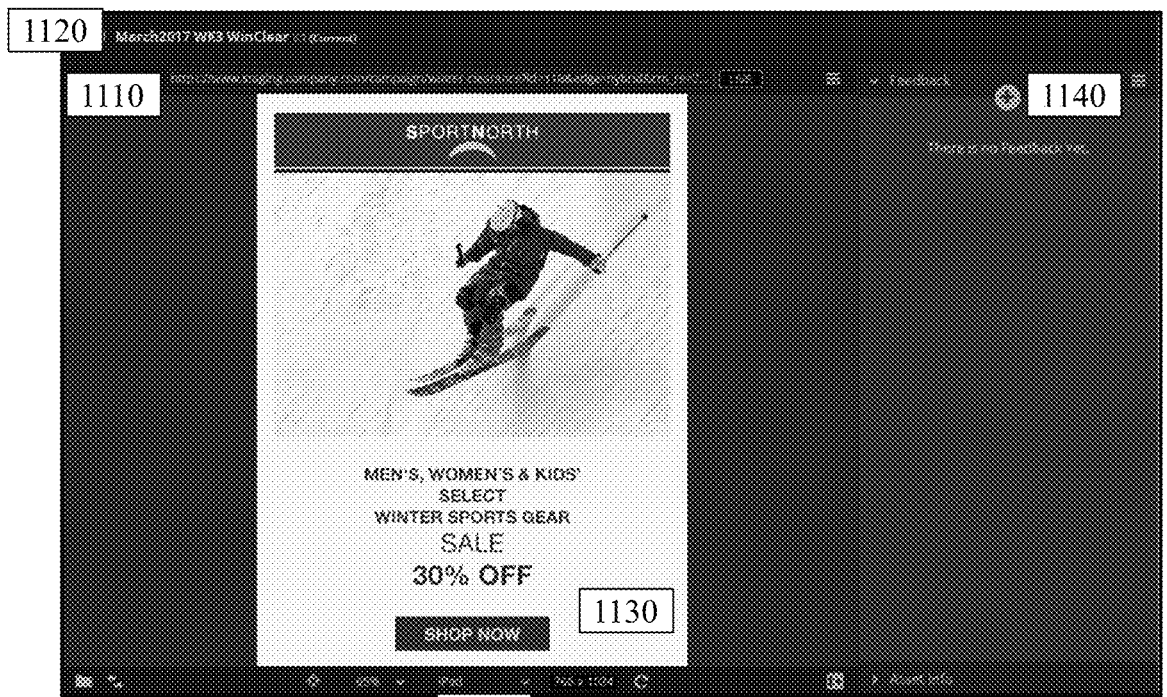
FIG. 11 depicts the merging of an acquired XWebR within a CCSAP according to an embodiment of the invention.

In FIG. 11 the user has elected to open the XWebR asset 1020 within "iPad" mode wherein they are presented with the Image 1130 of the XWebR asset 1020. They are also presented with the URL 1110 and Identity 1120 wherein the URL 1110 indicates in addition to the URL in text form that the content is "LIVE" while the identity 1020 indicates that the viewer is viewing the "Current" asset rather than a previously stored asset. Accordingly, Image 1130 depicts how the HTML asset (XWebR asset 1020) would be displayed upon an Apple iPad. Drop-down menu 1150 presents to the user a list of supported device specific display modes allowing them to select which one they wish to exploit. Upon selecting a device within the Drop-down Menu 1150 the XWebR asset 1020 is displayed with the appropriate display resolution and device pixel ratio for the device display being emulated. Optionally, the emulation may include additional device specific features including, but not limited to, emulating touch events if applicable, emulating scrollbar overlays and/or meta viewports, and autosizing text where pages for the device would not have a defined viewport. The "Responsive Viewport" of FIG. 10 allows the content creation team to view their design in a wider range of formats that solely electronic device displays allowing assessment of the content against unknown or future device types as well as online web browser access, desktop publishing, print formats etc. Optionally, the selected mode from the Drop Down Menu 1150 may be configured via a settings control interface for aspects such as display resolution, device pixel ratio, and display orientation for example as well as supporting user selectable options through a second pop-up menu relating to options available for that specific device such as the device's default browser user interface design, a predetermined browser with navigation bar (e.g. Chrome™), with and/or without opened keyboard displayed upon touch sensitive display, etc. Accordingly, the content creator(s) may view the HTML asset in a variety of formats and as evident from the discussion below provide feedback which is general and/or specific to a particular emulated device etc.

Figure 12:
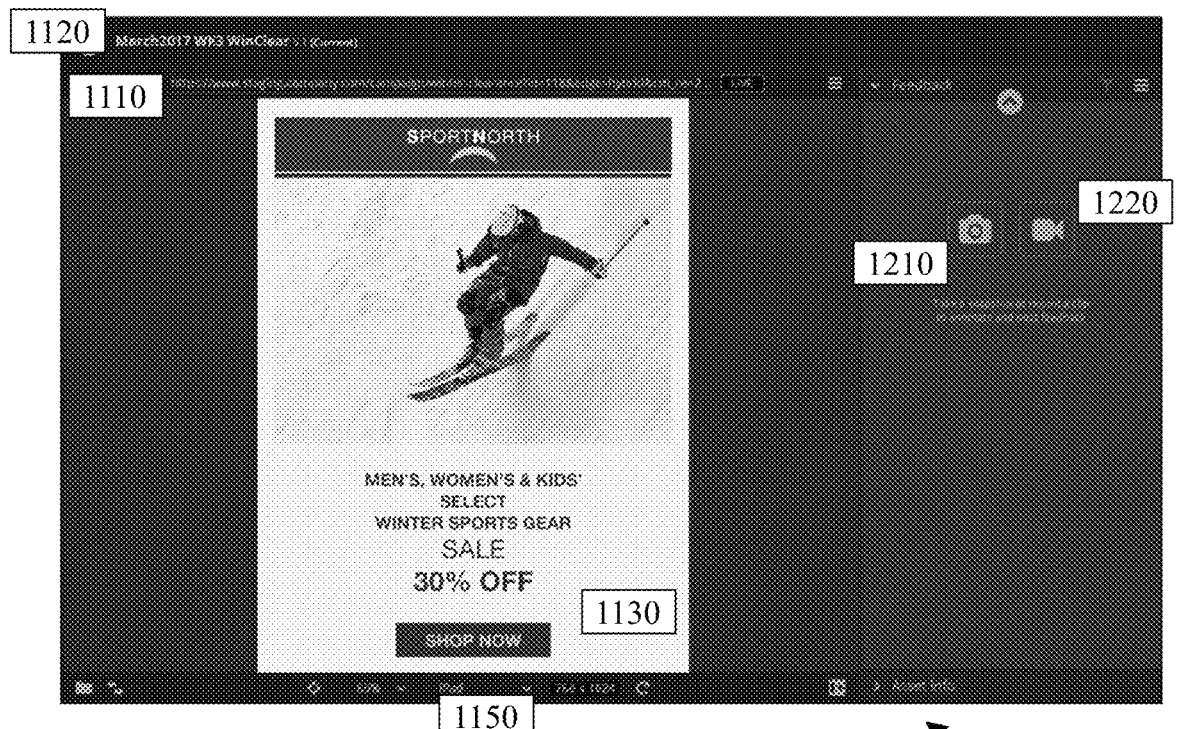
FIGS. 12 to 15 depict the addition of a comment via a snapshot and annotation of a XWebR within a CCSAP according to an embodiment of the invention.

The user viewing the GUI 1100 is also presented within a feedback option which is enabled by clicking on the Feedback Icon 1140. Upon selecting this the display portion on the right hand side transitions as depicted in FIG. 12 with GUI 1200. Accordingly, the URL 1110, Identity 1120, the Image 1130 are displayed for the same selected device from the Drop Down Menu 1150 as that selected when the Feedback Icon 1140 is selected. However, if the user once Feedback Icon 1140 is selected changes the emulated device through the Drop Down Menu then within some embodiments of the invention the feedback provided changes to reflect only that feedback provided for the previous selected emulated device. Alternatively, the feedback may be displayed across all emulated devices. As depicted in GUI 1200 upon selecting Feedback Icon 1140 the feedback portion of the GUI adjusts to provide the user with format icons 1210 and 1220 relating to adding feedback to a "snapshot" image of the XWebR Asset or a "clip" of the XWebR asset.

Figure 13:
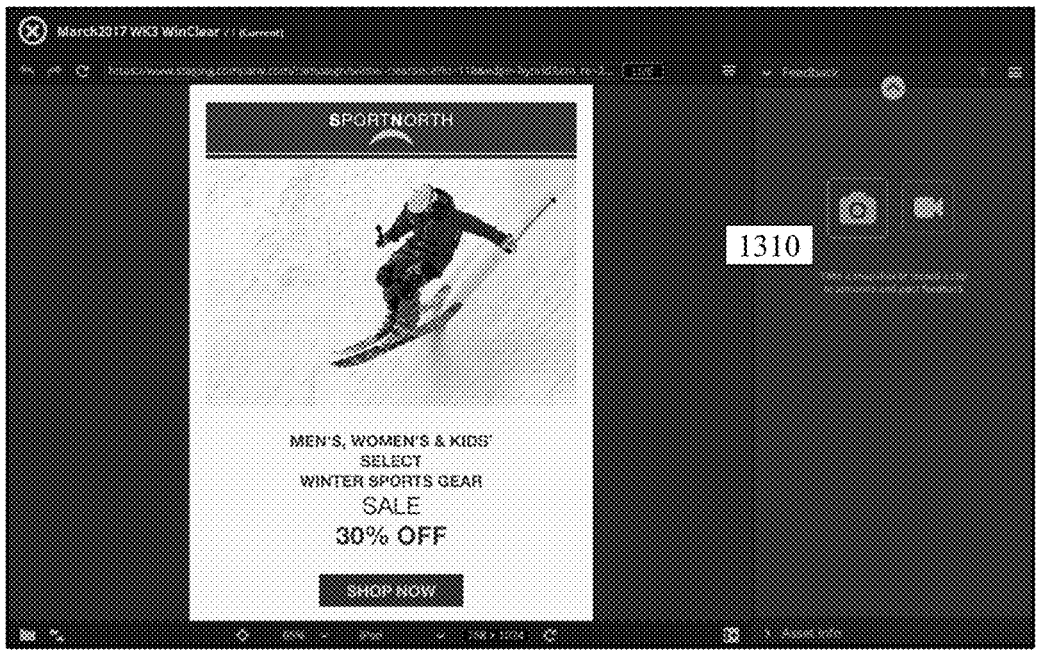
Figure 14:
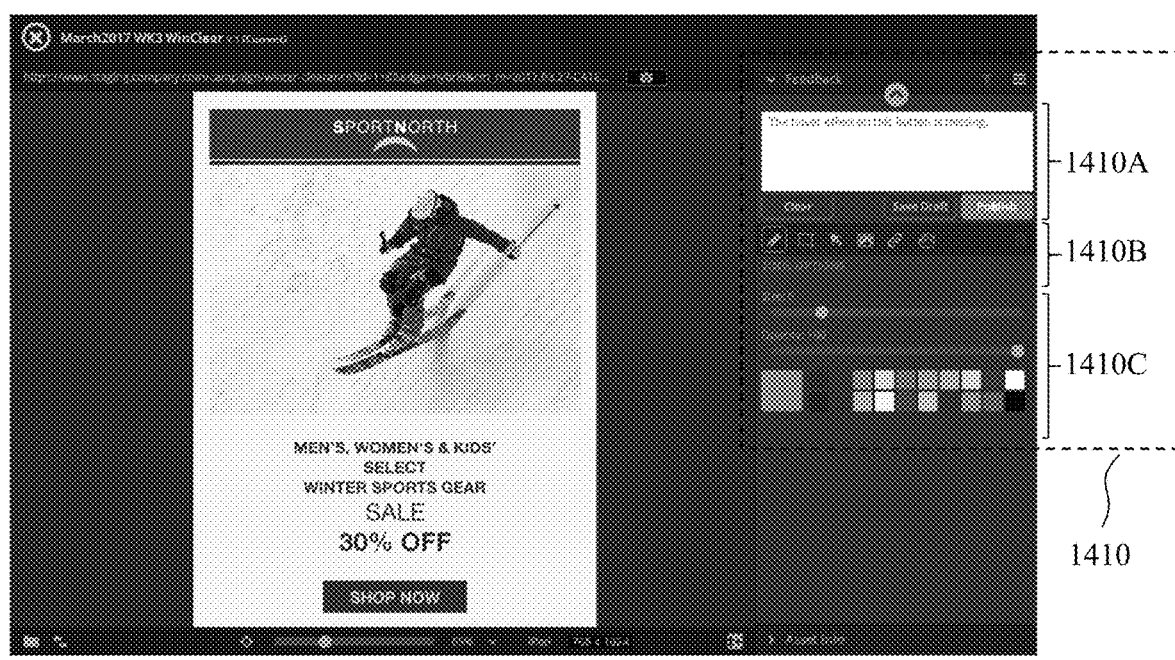

Referring to FIG. 13 the user elects to select the "Snapshot" icon 1310 wherein they are presented with GUI 1400 in FIG. 14 with drop-down annotation tool 1410 which includes first to third regions 1410A to 1410C respectively. These being:

First region 1410A: Text based entry of comment from user together with ability to clear current comment and re-start, save draft during working, and publish the comment with annotations.

Second region 1410B: Options with respect to entering visual annotations that are non-text based, such as adding lines, shapes, arrows, images, links, etc. together with a delete option.

Third region 1410C: Adapts in respect of the tool option selected by the user wherein as displayed the user has selected "line" and hence the options are line size, line opacity, and line colour.

Figure 15:
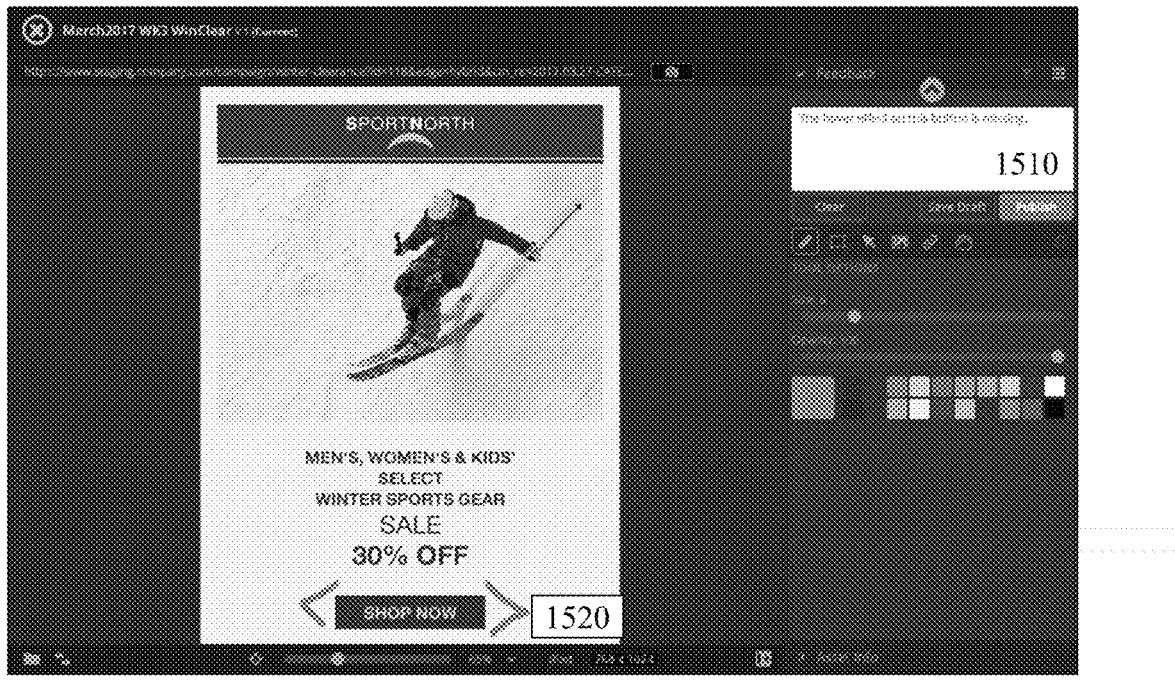

Accordingly, referring to FIG. 15 and GUI 1500 the user has entered the text comment 1510, "The hover effect on this button is missing", and added visual indicators 1520 using the line tool option to identify the specific portion of the content that their comment relates to, in this instance the "SHOP NOW" button lacking a change in appearance or audiovisual signal when the user hovers their mouse or finger over the button. It would be evident that the feedback may be specific to one device type, e.g. in this instance it may be specifically linked to a particular device or it may be indicated as generic to a family of devices, all devices, etc.

Optionally, the dropdown presented may allow a user to simply tag multiple devices that they have identified an issue with and have their comment applied to all of those devices concurrently upon publishing or this list being evident to any subsequent viewer so that they are aware of how general/specific the issue is. Optionally, the actual creative content may have been created and stored with some inherent platform, e.g. operating system, dependencies rather than generically. In these instances, the user when changing device type as discussed supra in respect of FIGS. 10 and 11 may access different creative content wherein aspects of the content are platform or device specific. Optionally, where platform and/or device specific variances are identified then the publishing in addition to storing the comments/annotations etc. within the file system of the CCSAP for audit trail, monitoring, distribution etc. may trigger specific alerts, e.g. "Tom, SportNorth Week 3 content does not work on iPad" or "Team: Issues being identified on all iOS devices" etc. rather than a generic "Tom, Alice has reviewed the SportNorth Week 3 content."

Once, the user selects "Publish" then the creative content is stored together with annotations, comments, etc. and data relating to who commented, when, etc. Accordingly, while the embodiments of the invention provided for acquisition and embedding of HTML assets, HTML based assets, static assets and dynamic assets these are undertaken within the framework of a content management/project management toolset as known in the prior art, such as ConceptShare™ for example, which provides for automated review/approval processes within creative content production environments. Accordingly, HTML assets are managed within a CCSAP according to embodiments of the invention such that the user reviewing/approving/commenting is not performing these processes in a manner unfamiliar to them as the CCSAP according to embodiments of the invention embeds HTML assets within the process just as if the user were reviewing an image, e.g. JPEG, TIFF, etc. or a document, e.g. PDF.

Figure 16:
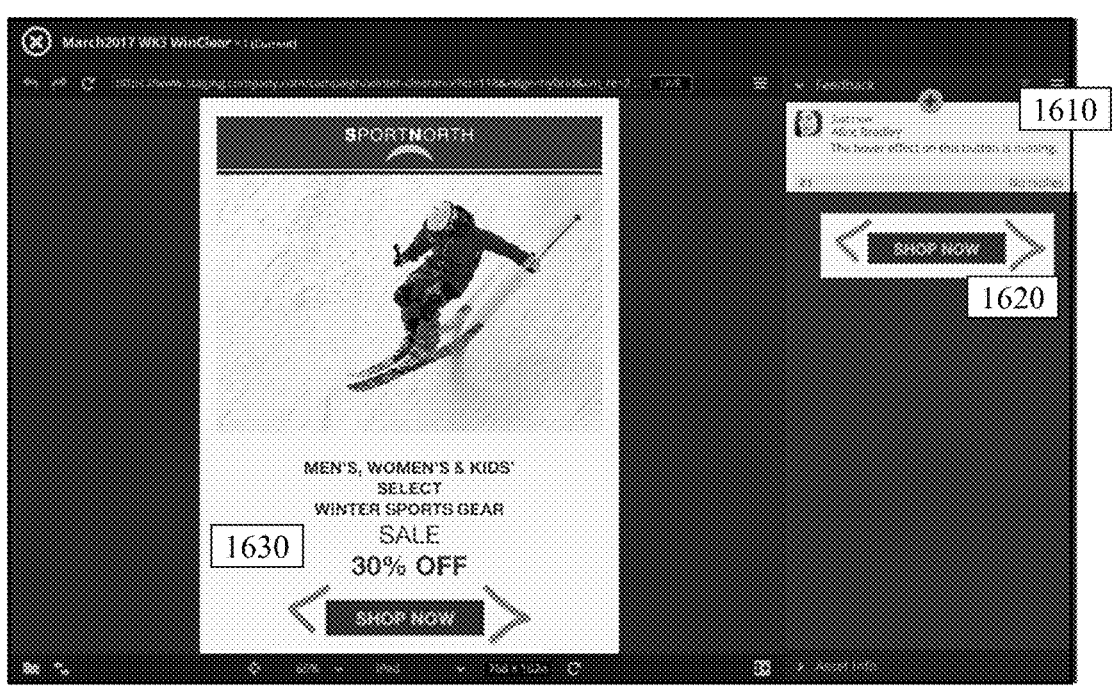
FIGS. 16 to 19 depict the viewing of a snapshot-based annotation of a XWebR within a CCSAP according to an embodiment of the invention.
Figure 17:
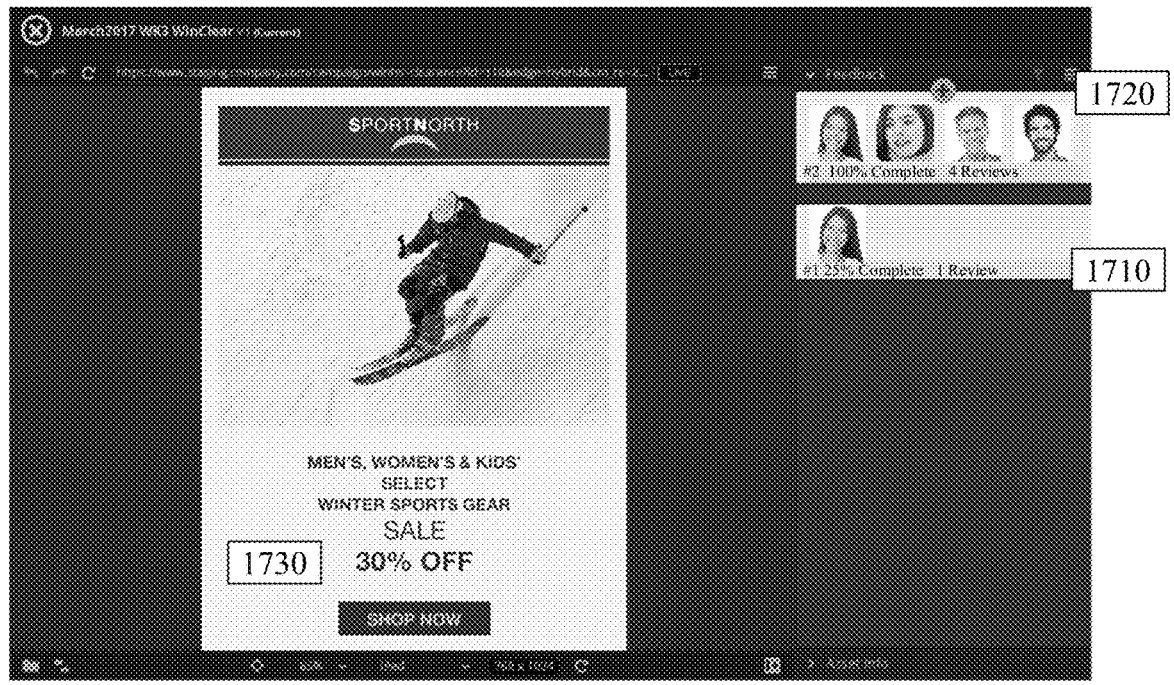

Accordingly, in FIG. 16 GUI 1600 is presented to a creative content author based upon the review performed by "Alice Bradley" wherein upon opening the asset reviewed the individual(s) identified as receiving the review see the amended content 1630 together with the feedback comment 1610 and a snapshot of the annotation 1620. For example, the CCSAP may define that reviewer comments are returned to the content creator/creative team for addressing as part of the approval/review process. Alternatively, they may be routed to a supervisory reviewer who may consolidate the comments from multiple reviewers or reject/identify disagreement etc. Alternatively, the viewer is presented with the creative content/HTML asset as originally submitted and then by clicking the reviewer views the comments/annotations that these have made. For example, within GUI 1700 in FIG. 17 the user is presented with the current content together with a historical review/approval process as defined by the CCSAP either by default or as established by the organization/enterprise employing the CCSAP. As depicted two review stages are depicted wherein First Review 1710 is shown to have been 25% complete based upon 1 review and Second Review 1720 is shown to be 100% complete. First review 1710 may have been a preliminary internal team review prior to client engagement or have been terminated early. Also depicted in GUI 1700 is the HTML asset 1730.

Figure 18:
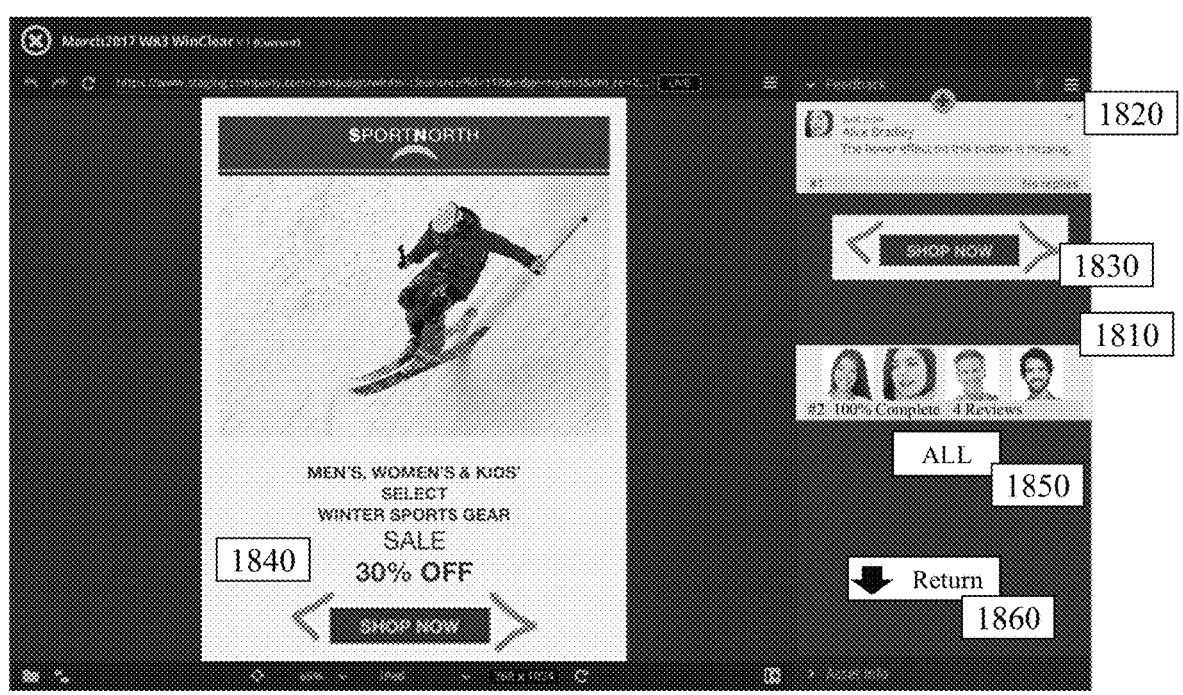

Next as depicted in GUI 1800 in FIG. 18 may have selected a reviewer, in this instance "Alice Bradley" within those presented in Second Review 1720 in GUI 1700 wherein the display adapts to show the Review Bar 1810 identifying all reviewers associated with that review as well as summary information "#2 100% Complete 4 Reviews." By selecting "Alice Bradley" her Feedback 1820 is depicted together with an Image Segment 1830 associated with her annotations of the asset which is depicted with her annotations in Image 1840. Accordingly, the user can view each reviewer's comments/annotations individually or alternatively by selecting "ALL" Button 1850 can display all comments/annotations provided. Accordingly, the reviewer may apply different weighting to comments/feedback/annotations provided by the client, his manager, etc. than those from in the team etc. and is able to isolate feedback specifically by user. Optionally, the user may identify an annotation within the asset and be presented with data relating to the reviewer(s) adding it. Such an isolation/filtering being beneficial in instances of significant annotations etc. or as evident from discussion below in respect of "dynamic" asset review where annotations may be distributed throughout the temporal duration of the asset or extended length assets such as those relating to brochures, magazines, etc. where the number of pages may be 2, 4, 8, etc. or any number other than a single sided page. If the user selects a different reviewer within the displayed group then their feedback, annotations etc. are displayed or they can, if finished reviewing, select "Return" Button 1860 and be returned to GUI 1700 for example.

Figure 19:
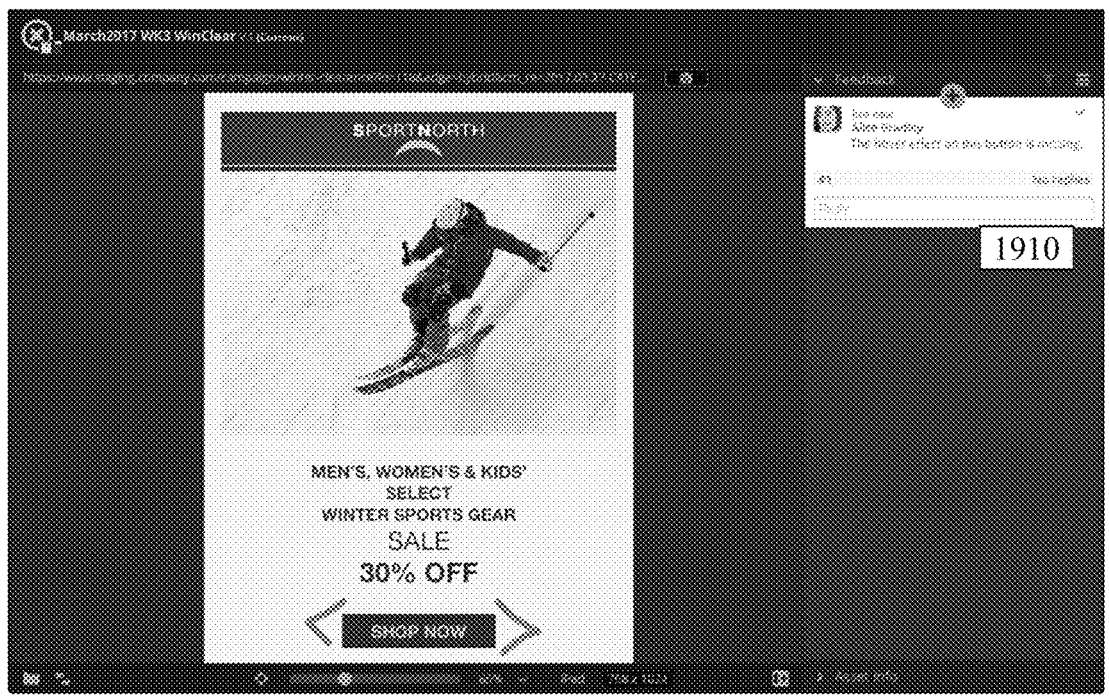

The user upon receiving a reviewer's comments may respond by selecting the comment 1910 as depicted in GUI 1900 in FIG. 19. This may be a simple text based dialogue so that a thread may be created and expanded as comments are added by different parties within the approval/review process relating to the same aspect of the creative content.

Figure 20:
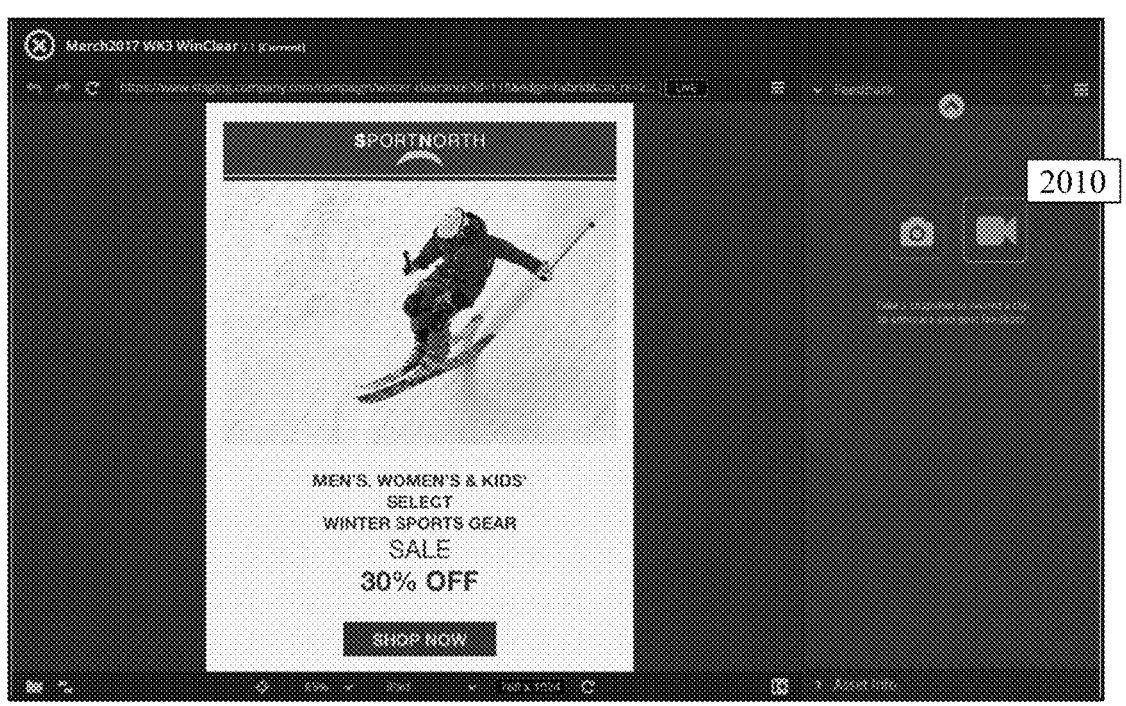
FIGS. 20 to 22 depict the addition of a comment via a clip and annotation of a XWebR within a CCSAP according to an embodiment of the invention.
Figure 21:
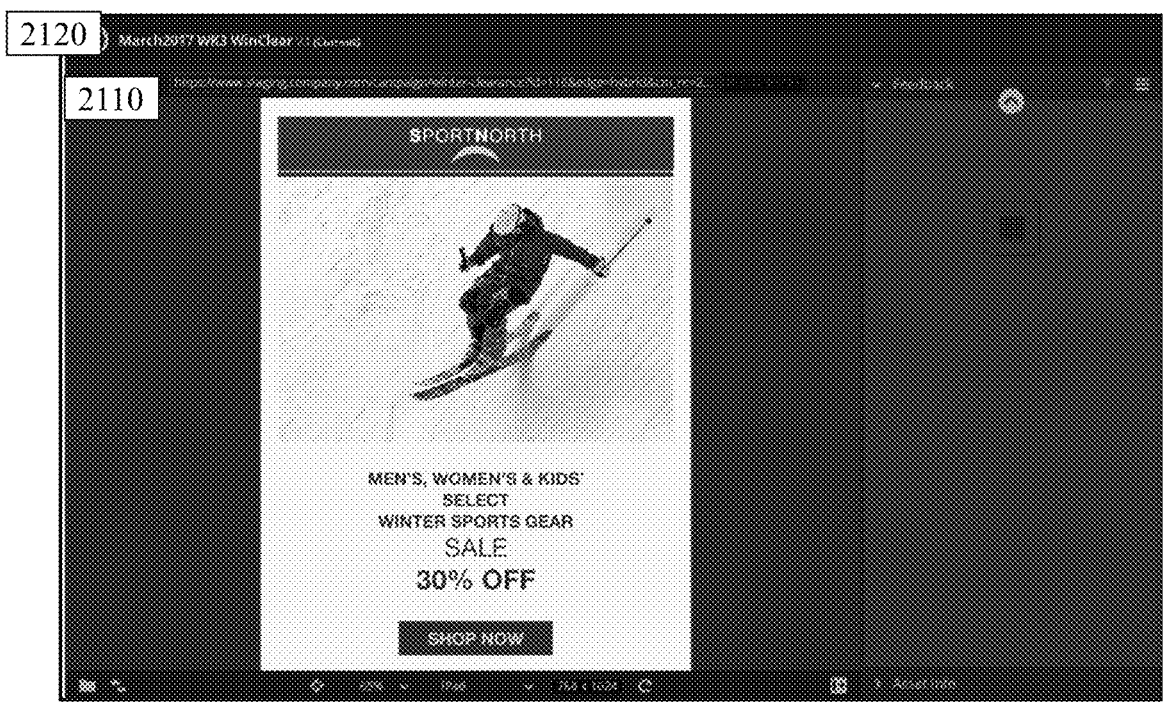
Figure 22:
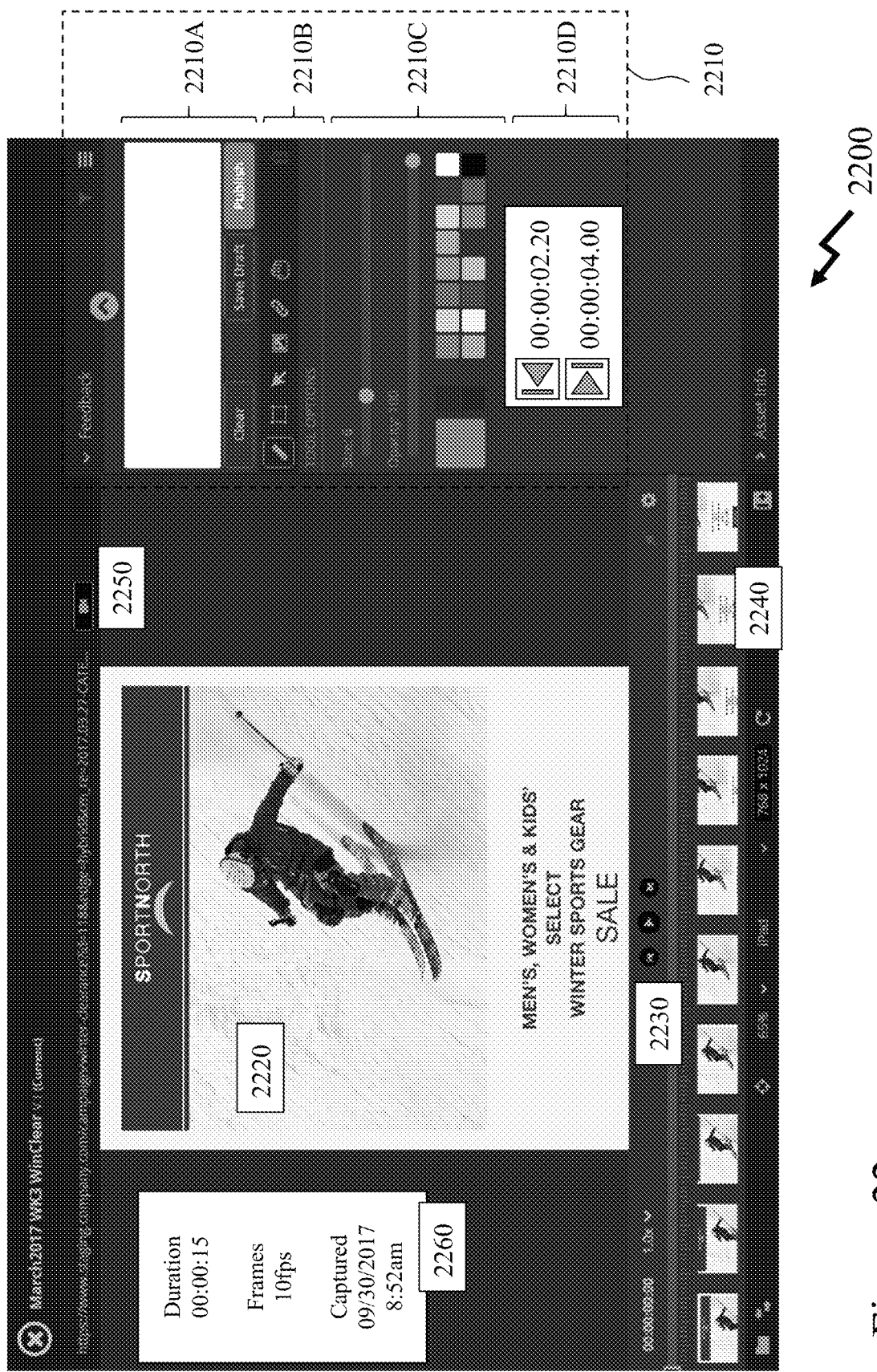

Now referring to FIGS. 20 to 22 there are depicted GUIs 2000 to 2200 respectively relating to a "clip" based comment and/or annotation process with respect to a XWebR within a CCSAP according to an embodiment of the invention. As discussed supra in respect of FIGS. 12 to 19 a user may during an approval/review/discussion process managed by a CCSAP according to an embodiment of the invention add comments and make annotations with respect to a HTML asset captured through a "snapshot" process. As depicted the user initially selects the "Clip" icon 2010 rather than the "Snapshot" icon, depicted as "Snapshot" icon 1310 in FIG. 13 supra. Accordingly, the process according to an embodiment of the invention "records" the HTML asset rather than displaying the "live" HTML asset in the instance of an image, document etc. This being depicted in FIG. 23 wherein the GUI 2100 now in addition to displaying the URL 2110 and Identity 2120 at the top of the GUI, so that the user knows what project they are working upon and which HTML asset, the URL 2110 indicates in addition to the URL in text form that the content is "RECORDING" while the icons on the right hand side of GUI 2000 are replaced with a different icon that is maintained while the recording process is performed.

Upon completion the GUI transitions to GUI 2200 wherein the icon 2250 adjacent the URL changes to indicate stored/recorded content. The user is then presented with recorded asset 2220, control bar 2230 for navigating their position through the recorded asset 2220, e.g. to different time points within the recorded asset 2220, and a thumbnail film 2240 of the recorded asset 2220. Also displayed is recorded asset data 2260 and drop-down annotation tool 2210 which includes first to fourth regions 2210A to 2210D respectively. These being:

First region 2210A: Text based entry of comment from user together with ability to clear current comment and re-start, save draft during working, and publish the comment with annotations.

Second region 2210B: Options with respect to entering visual annotations that are non-text based, such as adding lines, shapes, arrows, images, links, etc. together with a delete option.

Third region 2210C: Adapts in respect of the tool option selected by the user wherein as displayed the user has selected "line" and hence the options are line size, line opacity, and line color.

Fourth region 2210D: Allows a user to select start and stop time points within the recorded asset so that an annotation may be made through a portion of the recorded asset.

Accordingly, using techniques as known in the art the user may select a single frame, a group of frames, a specific start time, a specific stop time, etc. to apply a comment against or make an annotation across or over. It would be evident to one of skill in the art that more complex user interfaces (UIs) may be employed such that a user may create an annotation at an initial point and then select the frames/times over which it is displayed. Optionally, a user may identify start and stop points within the recorded asset and the CCSAP will interpolate position for intermediate frames etc. In this manner a recorded asset may be an audiovisual element such as live dance, live playing of a sport, live music rendition etc. so that the acquired audiovisual is initially uploaded to a website, e.g. YouTube, and accessed. In this manner review of elements to be embedded within an asset may themselves be reviewed/approved etc. during a creative content process that may extend to a final product employing multiple recorded assets. In this manner, the creative content approval/review process which is today addressing static advertising, marketing documents etc. can be applied to video production, movie production, stage production, etc.

Subsequently, once the user has made their comments, annotations etc. then the process of reviewing/approving etc. may be applied although now as depicted in FIG. 23 the user may elect to view a "Single Pane" as selected in GUI 2300 or as depicted in FIG. 24 within GUI 2400 elect to select "Live+Feedback." In this manner the user has options in respect of how they wish to view, access and work with the feedback from the other users. Accordingly, within "Single Pane" in GUI 2300 the user is presented with the feedback and annotations in a similar manner as to the snapshot methodology presented supra wherein feedback/annotations are presented but there is no live playback of the underlying asset to which the comments and feedback relate. In "Live+ Feedback" the user views the content as a clip wherein the annotations and feedback are presented to the user. In either mode the user may filter to a specific reviewer/approver such as described and depicted supra in respect of a snapshot asset. Optionally, within "Live+Feedback" the user may be able to exploit tools similar to those depicted in respect of a control bar, such as Control Bar 2230 in FIG. 23, allowing the user to play, pause, rewind and play at different speeds, or a thumbnail film, such as Thumbnail Film 2240 in FIG. 22. Optionally, the user may be presented with only those portions that have comments/feedback/annotations applied.

Upon receiving notice of another user completing a review/approval etc. then the user may view the asset as discussed previously with the feedback/annotations etc. but they may also view the original asset against the reviewed asset, as evident in FIG. 25, or they may view the revised asset against the reviewed asset to ensure that they have addressed all feedback.

Figure 25A:
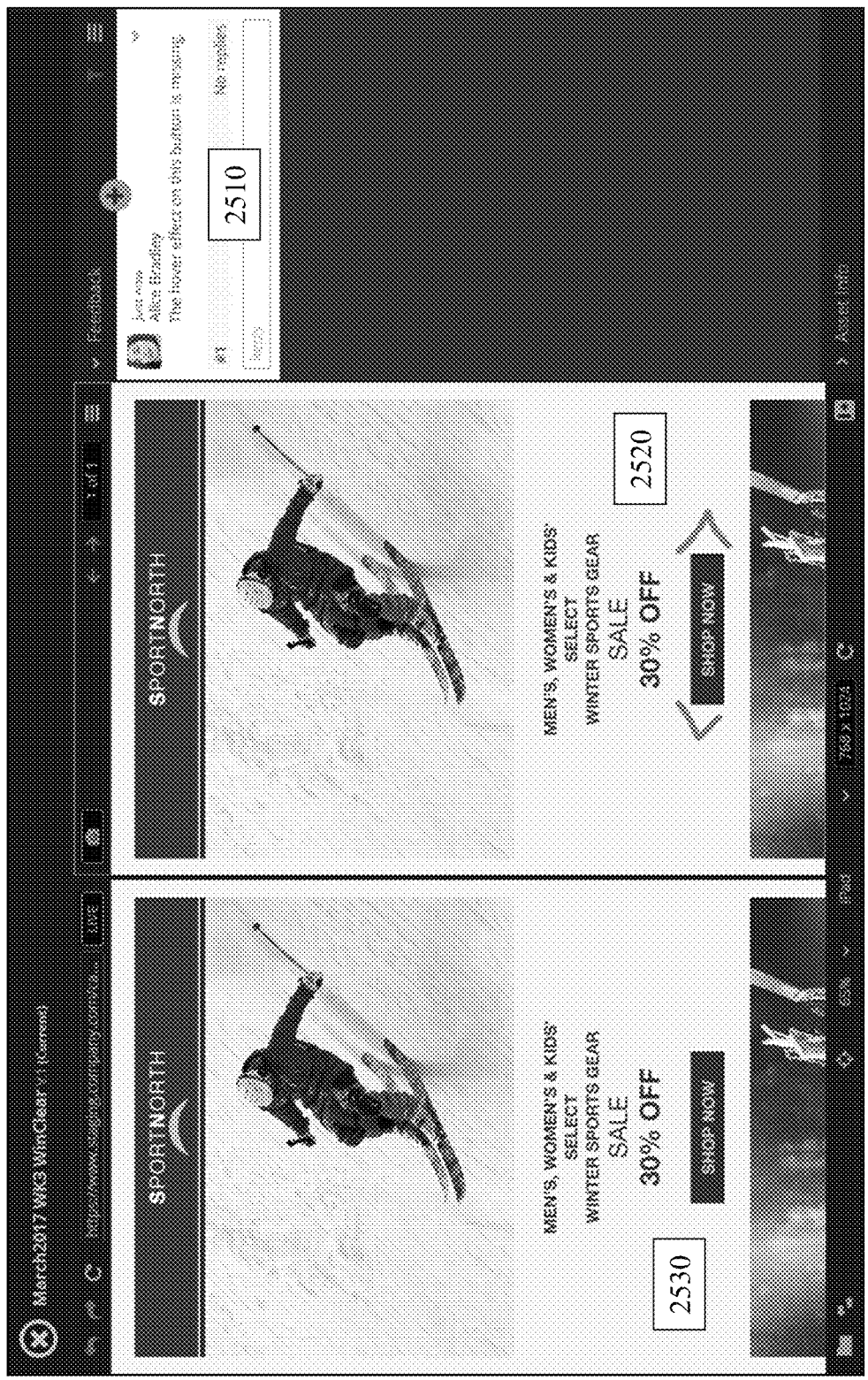
FIGS. 25A and 25B depicts viewing of current and previous versions of a XWebR within a CCSAP according to an embodiment of the invention.
Figure 25B:
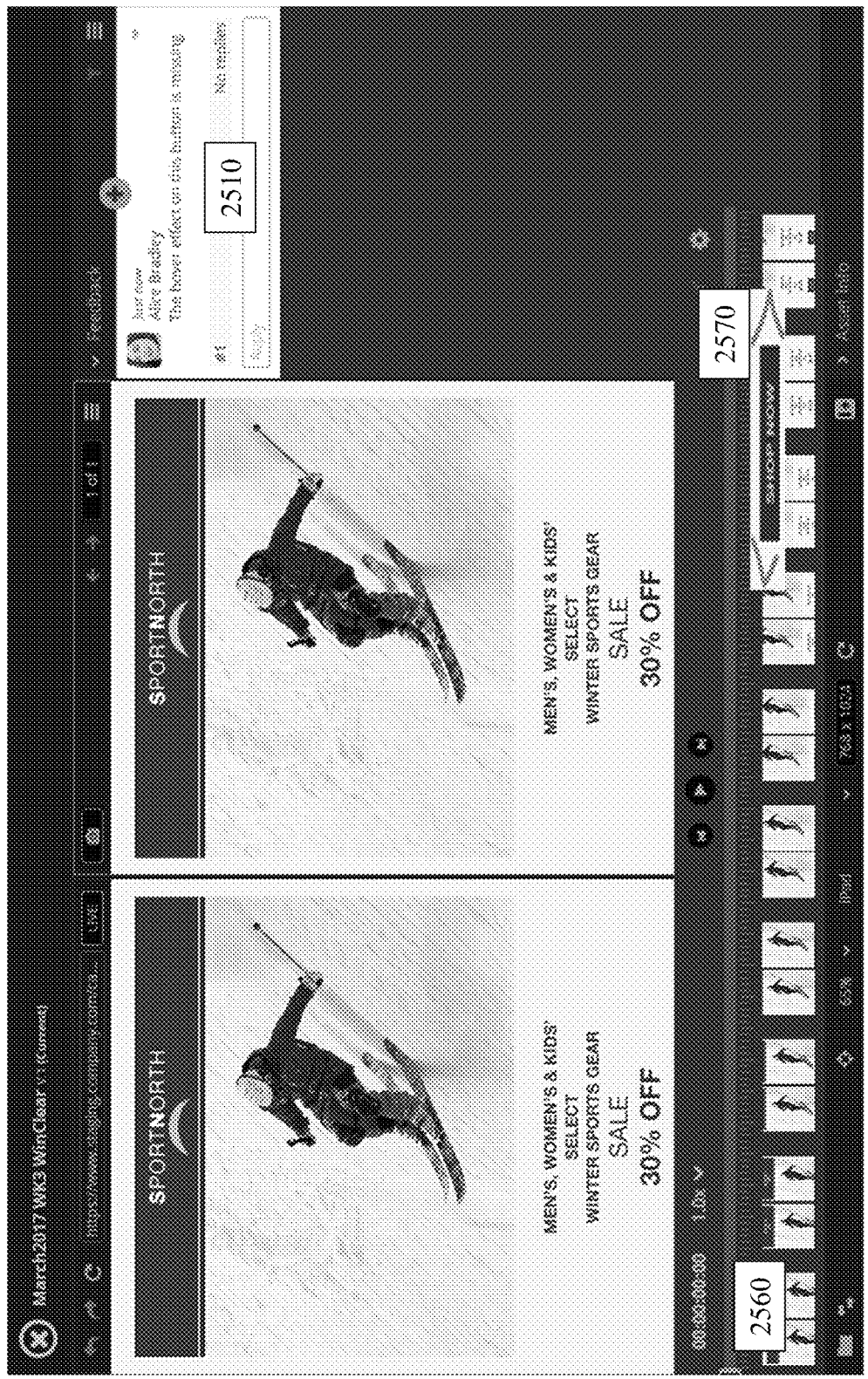

As depicted in FIGS. 25A and 25B a user is viewing the "live" asset which is displayed as Left Asset 2530 together with the recorded asset which is displayed as Reviewed Asset 2520 on the right and viewing the Feedback 2510. In FIG. 25A the user is viewing a snapshot whereas in FIG. 25B the user is viewing the clip and can exploit the full range of navigation items on the Timeline 2560 such as described supra in respect of FIG. 22. Optionally, the user can have annotations 2570 displayed within the timeline or markers displayed indicating regions of the recorded asset to which feedback relates. As evident in FIG. 25B the left asset is the "live" version whereas the right asset is the recorded asset.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but the process could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of presenting a hypertext markup language (HTML) asset comprising:

receiving, within an application executing on a computer system, a request from a user to acquire the HTML asset;

triggering, in response to the request, an instantiation of a new instance of an acquisition process;

presenting the acquired HTML asset to the user within a graphical user interface associated with the application;

sending uniform resource locator (URL) data to an application programming interface (API), the URL data entered by the user when generating the request;

establishing, with the API, one or more docker bindings to establish a new operating system dependent webdriver container, which includes a remote access process, which provides accessible remote access ports;

establishing services associated with said dependent webdriver container;

wherein instantiating the new instance of the acquisition process further comprises:
instantiating a new webdriver configured to:
connect to said dependent webdriver container,
launch the new operating system,
launch a browser within said dependent webdriver container, and
direct the browser to said URL.

2. The method of claim 1, further comprising:
receiving from said dependent webdriver container data relating to a port, Internet Protocol (IP) address, and a container identity referencing the webdriver employed in instantiating the container; and
launching a frame within the browser pointing to the IP address and port of the remote access process within the container.

3. The method of claim 2 further comprising
performing either a first process or a second process in dependence upon an aspect of the requested HTML asset, wherein:
said first process comprises requesting a screenshot to capture the HTML asset; and
said second process comprises employing an application to transcode a recording established in dependence upon triggering a start and a stop with respect to a playback of the HTML asset.

4. A system for storing and presenting a hypertext markup language (HTML) asset comprising:
a first computer wherein the HTML asset is stored; and
a second computer configured to;
execute an application to receive a request from a user to acquire the HTML asset;
trigger, in response to the request, an instantiation of a new instance of an acquisition process;
present the acquired HTML asset to a user within a graphical user interface associated with the application;
wherein said second computer is further configured to:
send uniform resource locator (URL) data to an application programming interface (API), wherein the URL data entered by the user when generating the request;
establish, with the API, one or more docker bindings to establish a new operating system dependent webdriver container, which includes a remote access process, whiCh provides accessible remote access ports;
establish services associated with said dependent webdriver container;
wherein instantiation of the new instance of the acquisition process by said second computer further comprises:
instantiating a new webdriver configured to:
connect to said dependent webdriver container,
launch an operating system,
launch a browser within said dependent webdriver container, and
direct the browser to said URL.

5. The system of claim 4, wherein said second computer is further configured to:
receive from said dependent webdriver container data relating to a port, Internet Protocol (IP) address, and a container identity referencing the webdriver employed in instantiating the container; and
launch a frame within the browser pointing to the IP address and port of the remote access process within the container.

6. The system of claim 5 wherein said second computer is further configured to:
perform either a first process or a second process in dependence upon an aspect of the requested HTML asset, wherein:
said first process comprises requesting a screenshot to capture the HTML asset; and
said second process comprises employing an application to transcode a recording established in dependence upon triggering a start and a stop with respect to a playback of the HTML asset.

7. The system of claim 4, wherein said first computer is a server.

* * * * *